(12) United States Patent
Lee

(10) Patent No.: US 11,413,763 B2
(45) Date of Patent: Aug. 16, 2022

(54) CHARGING ROBOT AND CONTROL METHOD THEREOF

(71) Applicant: LG ELECTRONICS INC., Seoul (KR)

(72) Inventor: Wonhee Lee, Seoul (KR)

(73) Assignee: LG ELECTRONICS INC., Seoul (KR)

(*) Notice: Subject to any disclaimer, the term of this patent is extended or adjusted under 35 U.S.C. 154(b) by 510 days.

(21) Appl. No.: 16/580,946

(22) Filed: Sep. 24, 2019

(65) Prior Publication Data

US 2020/0016760 A1 Jan. 16, 2020

(30) Foreign Application Priority Data

Jul. 25, 2019 (KR) .......................... 10-2019-0090507

(51) Int. Cl.
 *B25J 9/06* (2006.01)
 *B25J 9/16* (2006.01)
 (Continued)

(52) U.S. Cl.
 CPC ............... *B25J 9/1697* (2013.01); *B25J 9/06* (2013.01); *B25J 9/102* (2013.01); *B25J 9/12* (2013.01);
 (Continued)

(58) Field of Classification Search
 CPC ... B25J 9/1697; B25J 9/12; B25J 9/102; B25J 19/023; B25J 9/1666; B25J 9/1676;
 (Continued)

(56) References Cited

U.S. PATENT DOCUMENTS 9,266,440 B2 * 2/2016 Gao ........................ B60L 53/16
10,625,593 B2 * 4/2020 Gillett ..................... B62K 25/02
(Continued)

FOREIGN PATENT DOCUMENTS

KR 10-2005-0032197 A 4/2005
KR 10-2018-0010943 A 1/2018

OTHER PUBLICATIONS

Kawasaki et al., Toward next stage of kinetic humanoid hand, 2004, IEEE, p. 129-134 (Year: 2004).*
(Continued)

*Primary Examiner* — McDieunel Marc
(74) *Attorney, Agent, or Firm* — Birch, Stewart, Kolasch & Birch, LLP

(57) ABSTRACT

A charging robot includes: a station; a multi-joint manipulator including a plurality of first joints and a plurality of second joints which have rotation axes orthogonal to each other and are connected with each other alternately, the joint manipulator being provided on the station; a charging connector provided on an end of the multi-joint manipulator; a manipulator moving mechanism configured to move the multi-joint manipulator to an outside of the station; a first motor configured to pivot the first joint by a predetermined angle when the first joint is positioned at a set point; a first actuator configured to move the first motor toward the first joint and to connect the first motor to the first joint when the first joint is positioned at the set point; a second motor configured to pivot the second joint by a predetermined angle when the second joint is positioned at the set point; and a second actuator configured to move the second motor toward the second joint and to connect the second motor to the second joint when the second joint is positioned at the set point.

19 Claims, 23 Drawing Sheets

(51) Int. Cl.
    *B25J 9/10*         (2006.01)
    *B25J 9/12*         (2006.01)
    *B60L 53/37*      (2019.01)
    *B25J 11/00*      (2006.01)
    *B25J 13/08*      (2006.01)
    *B60L 53/16*      (2019.01)

(52) U.S. Cl.
    CPC ........... *B25J 9/1666* (2013.01); *B25J 11/008* (2013.01); *B25J 13/086* (2013.01); *B60L 53/16* (2019.02); *B60L 53/37* (2019.02)

(58) Field of Classification Search
    CPC ... B25J 11/008; B25J 19/06; B25J 9/06; B25J 13/086; B25J 9/042; B25J 17/0208; B25J 13/085; B60L 53/37; B60L 53/16; B60L 53/51; B60L 53/31; B60L 53/35; Y02T 90/12; Y02T 90/14; Y02T 10/7072; Y02T 10/70; H01R 13/6683; H01R 13/635; H01R 13/6315; H01R 43/26; H02J 2310/48; H02J 7/0027; H02J 7/0045
    See application file for complete search history.

(56) References Cited

U.S. PATENT DOCUMENTS

| | | | |
|---|---|---|---|
| 11,292,344 B2* | 4/2022 | Soden | B60L 53/18 |
| 2021/0298815 A1* | 9/2021 | Scheib | G06T 7/521 |
| 2022/0097554 A1* | 3/2022 | Hickey | H01M 50/262 |

OTHER PUBLICATIONS

Otsuki, Flexible space robotic manipulator with passively switching free joint to drive joint, 2010, IEEE, p. 1169-1174 (Year: 2010).*

Ohkami et al., Operational aspects of a super redundant space robot with reconfiguration and brachiating capability, 2002, IEEE, p. 178-183 (Year: 2002).*

Christoforou et al., Robotic manipulators with remotely-actuated joints: implementation using drive-shafts and u-joints, 2006, IEEE, p. 2866-2871 (Year: 2006).*

* cited by examiner

CHARGING ROBOT AND CONTROL METHOD THEREOF

CROSS-REFERENCE TO RELATED APPLICATION

The present application claims priority under 35 U.S.C. 119 and 35 U.S.C. 365 to Korean Patent Application No. 10-2019-0090507, filed on Jul. 25, 2019, which is hereby incorporated by reference in its entirety.

BACKGROUND

The present disclosure relates to a charging robot for charging electricity and a control method thereof.

Mechanical devices performing motions like human motions by using electrical or magnetic actions are generally referred to as robots. In recent years, robots are utilized in various fields with the enhancement of control technology, and for example, may include surgical robots, housekeeper robots, service robots, aerospace remote control robots, hazardous material processing robots, and the like. Such robots perform tasks by using a manipulator which is manufactured to perform motions similar to arm or hand gestures by an electrical or mechanical mechanism.

In particular, the service robot may include, for example, a charging robot for charging an electric car. A related-art charging robot may include a plurality of arms and an actuator, and uses a method of connecting a charging connector provided on/connected to an end of an end arm to a charging inlet of an electric car.

However, since such a related-art charging robot has a relatively large range of motion, there is a problem that a charging operation may not be appropriate in a small space such as a parking lot. In addition, there is a risk that persons may be injured due to the large range of motion.

SUMMARY

An object of the present disclosure is to provide a charging robot which can easily charge even in a small space, and a control method thereof.

A charging robot according to an embodiment of the present disclosure may include: a station; a multi-joint manipulator including a plurality of first joints and a plurality of second joints which have rotation axes orthogonal to each other and are connected with each other alternately, the joint manipulator being provided on the station; a charging connector provided on an end of the multi-joint manipulator; a manipulator moving mechanism configured to move the multi-joint manipulator to an outside of the station; a first motor configured to pivot the first joint by a predetermined angle when the first joint is positioned at a set point; a first actuator configured to move the first motor toward the first joint and to connect the first motor to the first joint when the first joint is positioned at the set point; a second motor configured to pivot the second joint by a predetermined angle when the second joint is positioned at the set point; and a second actuator configured to move the second motor toward the second joint and to connect the second motor to the second joint when the second joint is positioned at the set point.

The charging robot according to an embodiment of the present disclosure may further include a guide configured to guide a movement of the multi-joint manipulator by the manipulator moving mechanism, and embedded in the station.

The set point may be positioned after an end of the guide with respect to a moving direction of the multi-joint manipulator.

Each of the first joint and the second joint may include: a main body rotating about the rotation axis; one pair of extension portions extended from an outer circumference of the main body longways in parallel to each other; and one pair of connectors formed on ends of the one pair of extension portions. The main body of the first joint may be connected to the connector of the second joint, and the main body of the second joint may be connected to the connector of the first joint.

The manipulator moving mechanism may include: a locking piston configured to be locked into the first joint or the second joint; a moving cylinder configured to insert the locking piston between the one pair of extension portions; a connection piston disposed in parallel to a longitudinal direction of the multi-joint manipulator and connected to the moving cylinder; and a fixing cylinder configured to move the connection piston in a direction parallel to a moving direction of the multi-joint manipulator.

Each of the first joint and the second joint may further include: a motor connection portion having the first motor or the second motor connected thereto, and penetrating through the connector; a clutch gear rotating along with the motor connection portion and teeth-engaged with an inner gear formed on an inner surface of the main body; and a clutch elastic member disposed inside the main body, and configured to press the clutch gear toward the connector.

The charging robot according to an embodiment of the present disclosure may further include: a safety sensor provided on an end of the multi-joint manipulator; and a controller configured to stop at least one of the manipulator moving mechanism, the first motor, the first actuator, the second motor, and the second actuator when a person or an obstacle is detected by the safety sensor.

The safety sensor may be movable between a first position further protruding forward than the charging connector, and a second position which is behind the first position.

The charging robot according to an embodiment of the present disclosure may further include: a sensor guide provided on an end of the multi-joint manipulator and configured to guide a movement of the safety sensor; and a sensor elastic member positioned within the sensor guide and configured to press the safety sensor toward the first position.

The charging robot according to an embodiment of the present disclosure may further include a camera provided on at least one of the station or an end of the multi-joint manipulator.

When a distance between the charging connector and an inlet to which the charging connector is connected is shorter than a set distance, based on image information of the camera, the controller may be configured to control at least one of the manipulator moving mechanism, the first motor, the first actuator, the second motor, and the second actuator to connect the charging connector to the inlet regardless of a result of detecting by the safety sensor.

The manipulator moving mechanism may be configured to move the multi-joint manipulator in a longitudinal direction of the multi-joint manipulator.

A control method of a charging robot according to an embodiment of the present disclosure may include: a position detection step of detecting position information of an inlet of an electric car based on image information of a camera; a control process calculation step of calculating a control process of a multi-joint manipulator having a charging connector provided on an end thereof, according to the position information of the inlet; a connection step of controlling the multi-joint manipulator according to the control process to connect the charging connector to the inlet; a charging step of charging the electric car through the charging connector; and a returning step of, when the charging is completed, controlling the multi-joint manipulator in reverse order of the control process to return the multi-joint manipulator to an original position.

The connection step may include: a pushing process of moving, by a manipulator moving mechanism, the multi-joint manipulator until one joint of the multi-joint manipulator reaches a set point; a motor connection process of connecting a motor to the one joint positioned at the set point; a pivoting process of pivoting, by the motor, the one joint by a predetermined angle; and a motor separation process of separating the motor from the one joint.

The connection step may further include a re-pushing process of, after the motor is separated from the one joint, moving, by the manipulator moving mechanism, the multi-joint manipulator until another joint connected to the one joint reaches the set point.

When the position of the inlet is changed in the middle of the connection step, a modification control process having the control process modified by using image information of the camera may be calculated.

When the position of the inlet is changed in the middle of the connection step, the multi-joint manipulator may be returned to the original position by controlling the multi-joint manipulator in reverse order of the modification control process at the returning step.

When a person or an obstacle is detected by a safety sensor provided on an end of the multi-joint manipulator in the middle of the connection step, the movement of the multi-joint manipulator may be stopped.

When a distance between the charging connector and the inlet is shorter than a set distance, the movement of the multi-joint manipulator may not be stopped regardless of a result of detecting by the safety sensor.

DETAILED DESCRIPTION OF THE EMBODIMENTS

Figure 1:
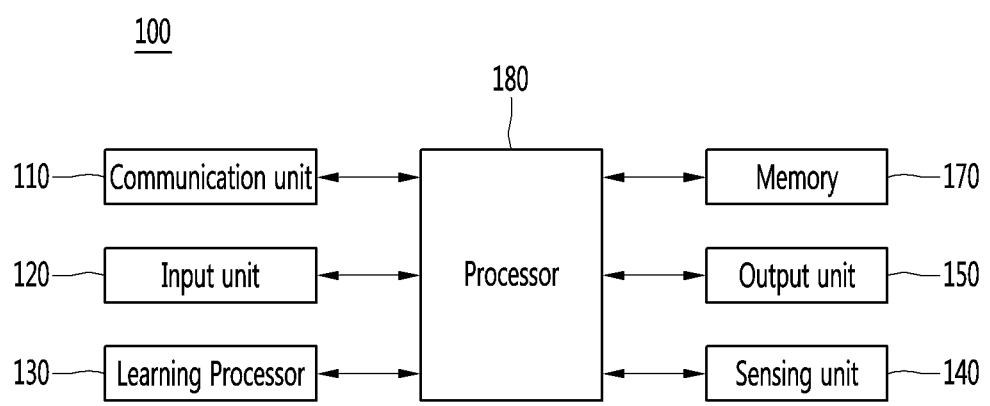
FIG. 1 illustrates an AI device 100 including a robot according to an embodiment of the present invention.

Hereinafter, specific embodiments of the present disclosure will be described in detail with reference to the drawings.

<Robot>

A robot may refer to a machine that automatically processes or operates a given task by its own ability. In particular, a robot having a function of recognizing an environment and performing a self-determination operation may be referred to as an intelligent robot.

Robots may be classified into industrial robots, medical robots, home robots, military robots, and the like according to the use purpose or field.

The robot includes a driving unit may include an actuator or a motor and may perform various physical operations such as moving a robot joint. In addition, a movable robot may include a wheel, a brake, a propeller, and the like in a driving unit, and may travel on the ground through the driving unit or fly in the air.

<Artificial Intelligence (AI)>

Artificial intelligence refers to the field of studying artificial intelligence or methodology for making artificial intelligence, and machine learning refers to the field of defining various issues dealt with in the field of artificial intelligence and studying methodology for solving the various issues. Machine learning is defined as an algorithm that enhances the performance of a certain task through a steady experience with the certain task.

An artificial neural network (ANN) is a model used in machine learning and may mean a whole model of problem-solving ability which is composed of artificial neurons (nodes) that form a network by synaptic connections. The artificial neural network can be defined by a connection pattern between neurons in different layers, a learning process for updating model parameters, and an activation function for generating an output value.

The artificial neural network may include an input layer, an output layer, and optionally one or more hidden layers. Each layer includes one or more neurons, and the artificial neural network may include a synapse that links neurons to neurons. In the artificial neural network, each neuron may output the function value of the activation function for input signals, weights, and deflections input through the synapse.

Model parameters refer to parameters determined through learning and include a weight value of synaptic connection and deflection of neurons. A hyperparameter means a parameter to be set in the machine learning algorithm before learning, and includes a learning rate, a repetition number, a mini batch size, and an initialization function.

The purpose of the learning of the artificial neural network may be to determine the model parameters that minimize a loss function. The loss function may be used as an index to determine optimal model parameters in the learning process of the artificial neural network.

Machine learning may be classified into supervised learning, unsupervised learning, and reinforcement learning according to a learning method.

The supervised learning may refer to a method of learning an artificial neural network in a state in which a label for learning data is given, and the label may mean the correct answer (or result value) that the artificial neural network must infer when the learning data is input to the artificial neural network. The unsupervised learning may refer to a method of learning an artificial neural network in a state in which a label for learning data is not given. The reinforcement learning may refer to a learning method in which an agent defined in a certain environment learns to select a behavior or a behavior sequence that maximizes cumulative compensation in each state.

Machine learning, which is implemented as a deep neural network (DNN) including a plurality of hidden layers among artificial neural networks, is also referred to as deep learning, and the deep learning is part of machine learning. In the following, machine learning is used to mean deep learning.

FIG. 1 illustrates an AI device 100 including a robot according to an embodiment of the present invention.

The AI device 100 may be implemented by a stationary device or a mobile device, such as a TV, a projector, a mobile phone, a smartphone, a desktop computer, a notebook, a digital broadcasting terminal, a personal digital assistant (PDA), a portable multimedia player (PMP), a navigation device, a tablet PC, a wearable device, a set-top box (STB), a DMB receiver, a radio, a washing machine, a refrigerator, a desktop computer, a digital signage, a robot, a vehicle, and the like.

Referring to FIG. 1, the AI device 100 may include a communication unit 110, an input unit 120, a learning processor 130, a sensing unit 140, an output unit 150, a memory 170, and a processor 180.

The communication unit 110 may transmit and receive data to and from external devices such as other AI devices 100a to 100e and the AI server 200 by using wire/wireless communication technology. For example, the communication unit 110 may transmit and receive sensor information, a user input, a learning model, and a control signal to and from external devices.

The communication technology used by the communication unit 110 includes GSM (Global System for Mobile communication), CDMA (Code Division Multi Access), LTE (Long Term Evolution), 56, WLAN (Wireless LAN), Wi-Fi (Wireless-Fidelity), Bluetooth, RFID (Radio Frequency Identification), Infrared Data Association (IrDA), ZigBee, NFC (Near Field Communication), and the like.

The input unit 120 may acquire various kinds of data.

At this time, the input unit 120 may include a camera for inputting a video signal, a microphone for receiving an audio signal, and a user input unit for receiving information from a user. The camera or the microphone may be treated as a sensor, and the signal acquired from the camera or the microphone may be referred to as sensing data or sensor information.

The input unit 120 may acquire a learning data for model learning and an input data to be used when an output is acquired by using learning model. The input unit 120 may acquire raw input data. In this case, the processor 180 or the learning processor 130 may extract an input feature by preprocessing the input data.

The learning processor 130 may learn a model composed of an artificial neural network by using learning data. The learned artificial neural network may be referred to as a learning model. The learning model may be used to an infer result value for new input data rather than learning data, and the inferred value may be used as a basis for determination to perform a certain operation.

At this time, the learning processor 130 may perform AI processing together with the learning processor 240 of the AI server 200.

At this time, the learning processor 130 may include a memory integrated or implemented in the AI device 100. Alternatively, the learning processor 130 may be implemented by using the memory 170, an external memory directly connected to the AI device 100, or a memory held in an external device.

The sensing unit 140 may acquire at least one of internal information about the AI device 100, ambient environment information about the AI device 100, and user information by using various sensors.

Examples of the sensors included in the sensing unit 140 may include a proximity sensor, an illuminance sensor, an acceleration sensor, a magnetic sensor, a gyro sensor, an inertial sensor, an RGB sensor, an IR sensor, a fingerprint recognition sensor, an ultrasonic sensor, an optical sensor, a microphone, a lidar, and a radar.

The output unit 150 may generate an output related to a visual sense, an auditory sense, or a haptic sense.

At this time, the output unit 150 may include a display unit for outputting time information, a speaker for outputting auditory information, and a haptic module for outputting haptic information.

The memory 170 may store data that supports various functions of the AI device 100. For example, the memory 170 may store input data acquired by the input unit 120, learning data, a learning model, a learning history, and the like.

The processor 180 may determine at least one executable operation of the AI device 100 based on information determined or generated by using a data analysis algorithm or a machine learning algorithm. The processor 180 may control the components of the AI device 100 to execute the determined operation.

To this end, the processor 180 may request, search, receive, or utilize data of the learning processor 130 or the memory 170. The processor 180 may control the components of the AI device 100 to execute the predicted operation or the operation determined to be desirable among the at least one executable operation.

When the connection of an external device is required to perform the determined operation, the processor 180 may generate a control signal for controlling the external device and may transmit the generated control signal to the external device.

The processor 180 may acquire intention information for the user input and may determine the user's requirements based on the acquired intention information.

The processor 180 may acquire the intention information corresponding to the user input by using at least one of a speech to text (STT) engine for converting speech input into a text string or a natural language processing (NLP) engine for acquiring intention information of a natural language.

At least one of the STT engine or the NLP engine may be configured as an artificial neural network, at least part of which is learned according to the machine learning algorithm. At least one of the STT engine or the NLP engine may be learned by the learning processor 130, may be learned by the learning processor 240 of the AI server 200, or may be learned by their distributed processing.

The processor 180 may collect history information including the operation contents of the AI apparatus 100 or the user's feedback on the operation and may store the collected history information in the memory 170 or the learning processor 130 or transmit the collected history information to the external device such as the AI server 200. The collected history information may be used to update the learning model.

The processor 180 may control at least part of the components of AI device 100 so as to drive an application program stored in memory 170. Furthermore, the processor 180 may operate two or more of the components included in the AI device 100 in combination so as to drive the application program.

Figure 2:
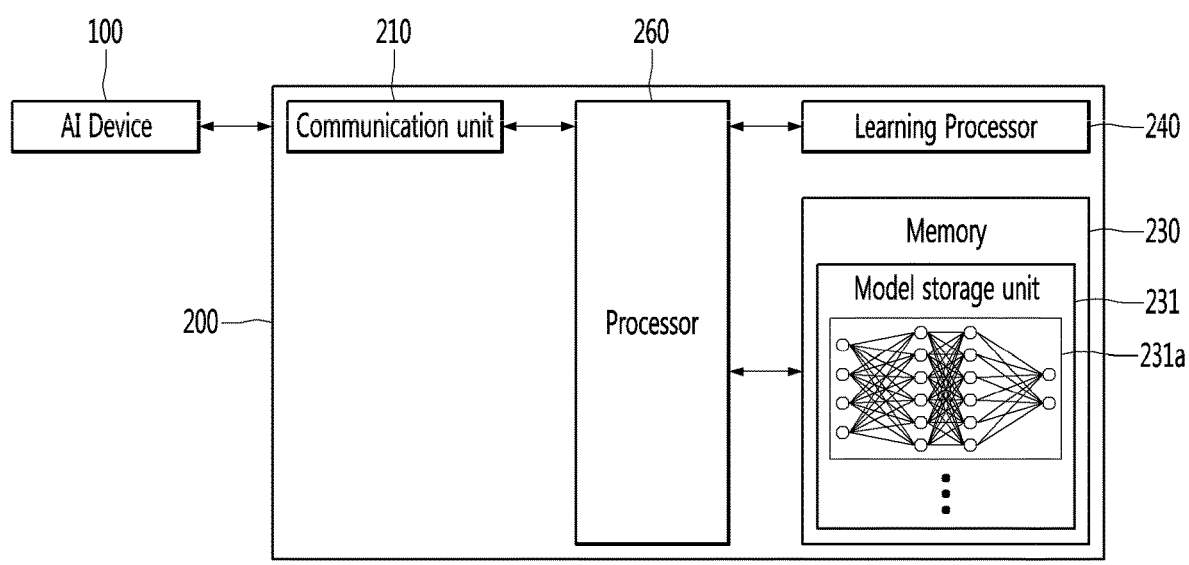
FIG. 2 illustrates an AI server 200 connected to a robot according to an embodiment of the present invention.

FIG. 2 illustrates an AI server 200 connected to a robot according to an embodiment of the present invention.

Referring to FIG. 2, the AI server 200 may refer to a device that learns an artificial neural network by using a machine learning algorithm or uses a learned artificial neural network. The AI server 200 may include a plurality of servers to perform distributed processing, or may be defined as a 5G network. At this time, the AI server 200 may be included as a partial configuration of the AI device 100, and may perform at least part of the AI processing together.

The AI server 200 may include a communication unit 210, a memory 230, a learning processor 240, a processor 260, and the like.

The communication unit 210 can transmit and receive data to and from an external device such as the AI device 100.

The memory 230 may include a model storage unit 231. The model storage unit 231 may store a learning or learned model (or an artificial neural network 231a) through the learning processor 240.

The learning processor 240 may learn the artificial neural network 231a by using the learning data. The learning model may be used in a state of being mounted on the AI server 200 of the artificial neural network, or may be used in a state of being mounted on an external device such as the AI device 100.

The learning model may be implemented in hardware, software, or a combination of hardware and software. If all or part of the learning models are implemented in software, one or more instructions that constitute the learning model may be stored in memory 230.

The processor 260 may infer the result value for new input data by using the learning model and may generate a response or a control command based on the inferred result value.

Figure 3:
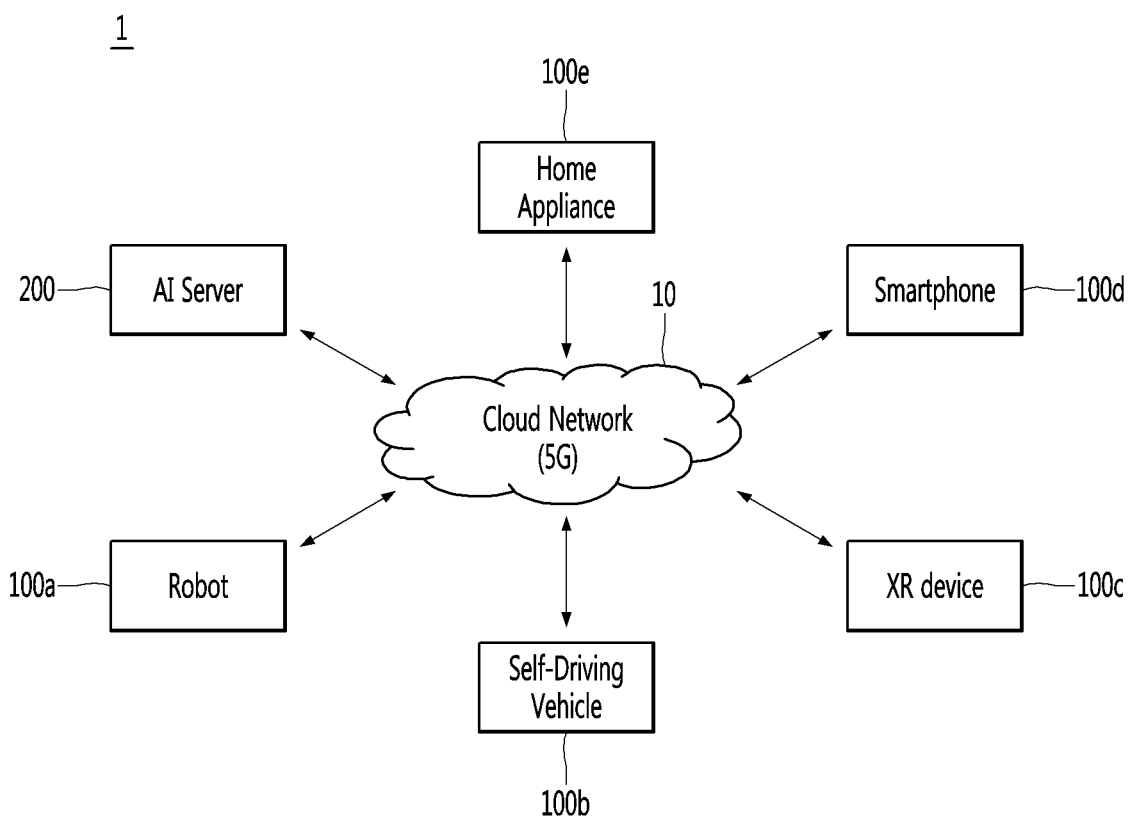
FIG. 3 illustrates an AI system 1 according to an embodiment of the present invention.

FIG. 3 illustrates an AI system 1 according to an embodiment of the present invention.

Referring to FIG. 3, in the AI system 1, at least one of an AI server 200, a robot 100a, a self-driving vehicle 100b, an XR device 100c, a smartphone 100d, or a home appliance 100e is connected to a cloud network 10. The robot 100a, the self-driving vehicle 100b, the XR device 100c, the smartphone 100d, or the home appliance 100e, to which the AI technology is applied, may be referred to as AI devices 100a to 100e.

The cloud network 10 may refer to a network that forms part of a cloud computing infrastructure or exists in a cloud computing infrastructure. The cloud network 10 may be configured by using a 3G network, a 4G or LTE network, or a 5G network.

That is, the devices 100a to 100e and 200 configuring the AI system 1 may be connected to each other through the cloud network 10. In particular, each of the devices 100a to 100e and 200 may communicate with each other through a base station, but may directly communicate with each other without using a base station.

The AI server 200 may include a server that performs AI processing and a server that performs operations on big data.

The AI server 200 may be connected to at least one of the AI devices constituting the AI system 1, that is, the robot 100a, the self-driving vehicle 100b, the XR device 100c, the smartphone 100d, or the home appliance 100e through the cloud network 10, and may assist at least part of AI processing of the connected AI devices 100a to 100e.

At this time, the AI server 200 may learn the artificial neural network according to the machine learning algorithm instead of the AI devices 100a to 100e, and may directly store the learning model or transmit the learning model to the AI devices 100a to 100e.

At this time, the AI server 200 may receive input data from the AI devices 100a to 100e, may infer the result value for the received input data by using the learning model, may generate a response or a control command based on the inferred result value, and may transmit the response or the control command to the AI devices 100a to 100e.

Alternatively, the AI devices 100a to 100e may infer the result value for the input data by directly using the learning model, and may generate the response or the control command based on the inference result.

Hereinafter, various embodiments of the AI devices 100a to 100e to which the above-described technology is applied will be described. The AI devices 100a to 100e illustrated in FIG. 3 may be regarded as a specific embodiment of the AI device 100 illustrated in FIG. 1.

<AI+Robot>

The robot 100a, to which the AI technology is applied, may be implemented as a guide robot, a carrying robot, a cleaning robot, a wearable robot, an entertainment robot, a pet robot, an unmanned flying robot, or the like.

The robot 100a may include a robot control module for controlling the operation, and the robot control module may refer to a software module or a chip implementing the software module by hardware.

The robot 100a may acquire state information about the robot 100a by using sensor information acquired from various kinds of sensors, may detect (recognize) surrounding environment and objects, may generate map data, may determine the route and the travel plan, may determine the response to user interaction, or may determine the operation.

The robot 100a may use the sensor information acquired from at least one sensor among the lidar, the radar, and the camera so as to determine the travel route and the travel plan.

The robot 100a may perform the above-described operations by using the learning model composed of at least one artificial neural network. For example, the robot 100a may recognize the surrounding environment and the objects by using the learning model, and may determine the operation by using the recognized surrounding information or object information. The learning model may be learned directly from the robot 100a or may be learned from an external device such as the AI server 200.

At this time, the robot 100a may perform the operation by generating the result by directly using the learning model, but the sensor information may be transmitted to the external device such as the AI server 200 and the generated result may be received to perform the operation.

The robot 100a may use at least one of the map data, the object information detected from the sensor information, or the object information acquired from the external apparatus to determine the travel route and the travel plan, and may control the driving unit such that the robot 100a travels along the determined travel route and travel plan.

The map data may include object identification information about various objects arranged in the space in which the robot 100a moves. For example, the map data may include object identification information about fixed objects such as walls and doors and movable objects such as pollen and desks. The object identification information may include a name, a type, a distance, and a position.

In addition, the robot 100a may perform the operation or travel by controlling the driving unit based on the control/interaction of the user. At this time, the robot 100a may acquire the intention information of the interaction due to the user's operation or speech utterance, and may determine the response based on the acquired intention information, and may perform the operation.

Figure 4:
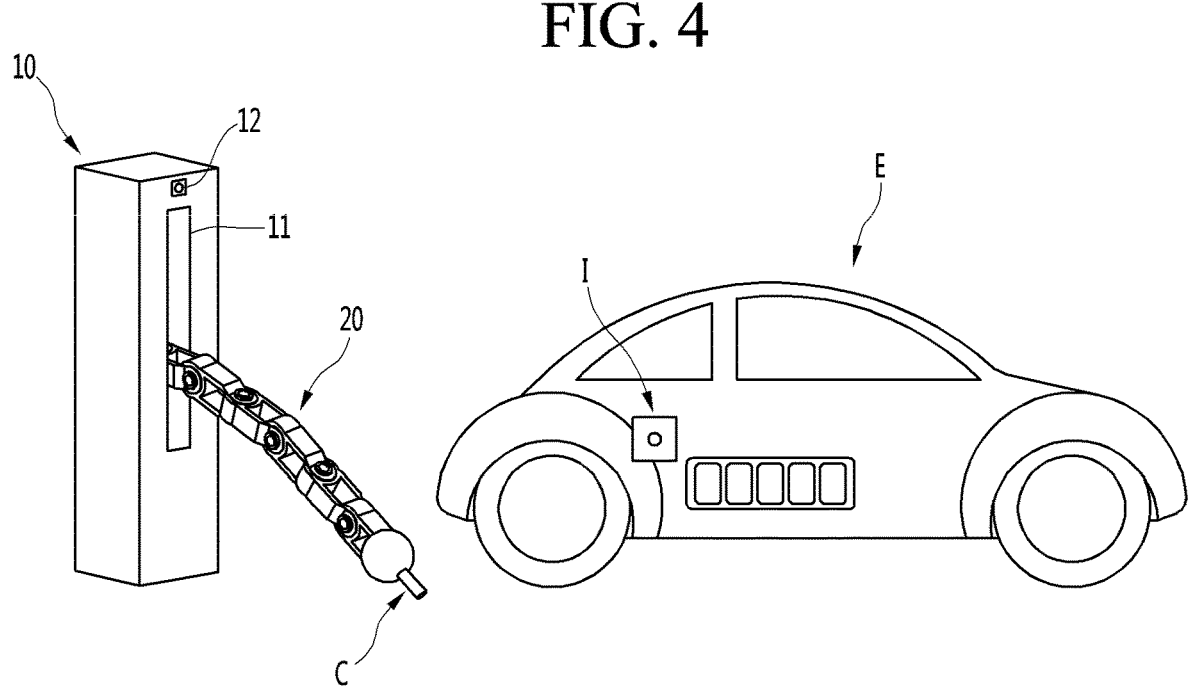
FIG. 4 is a schematic view of a charging robot according to an embodiment of the present disclosure.
Figure 5A:
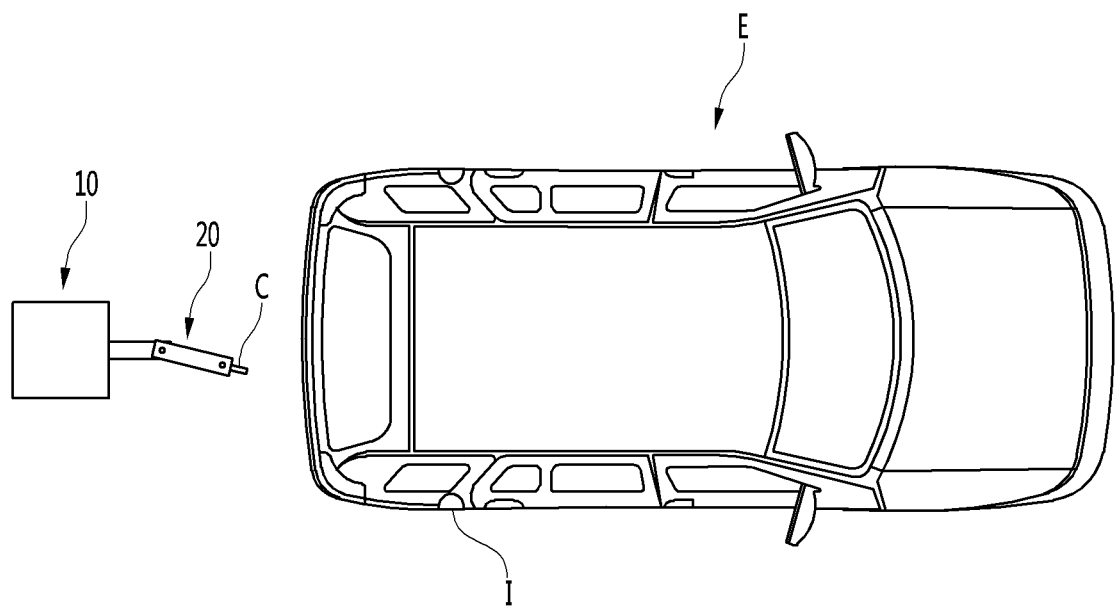
FIGS. 5A and 5B are views to explain an action of the charging robot according to an embodiment of the present disclosure.
Figure 5B:
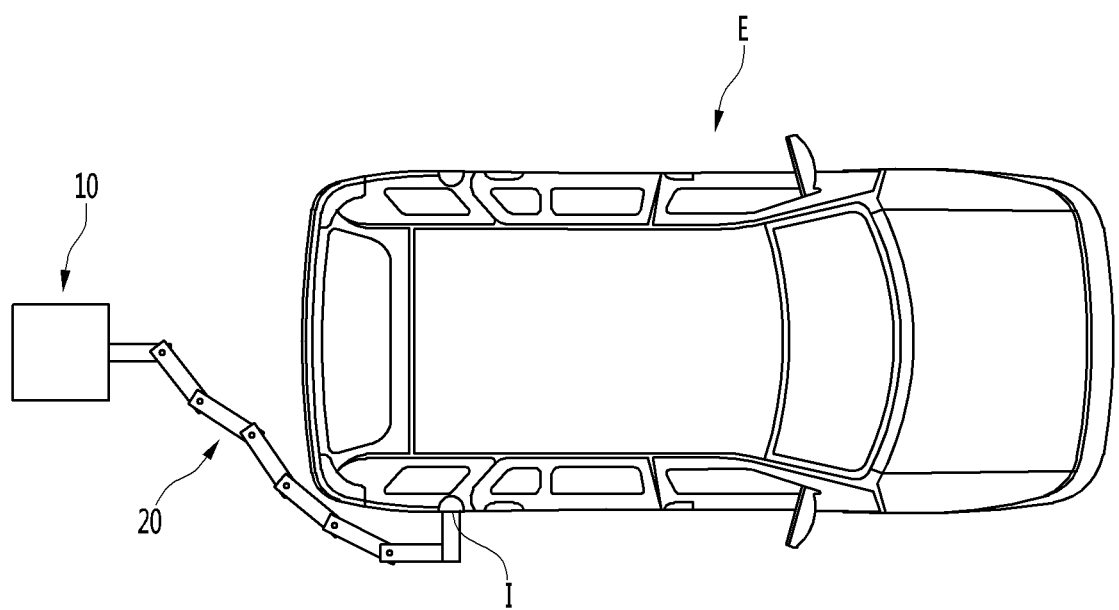

FIG. 4 is a schematic view of a charging robot according to an embodiment of the present disclosure, and FIGS. 5A and 5B are views to explain an action of the charging robot according to an embodiment of the present disclosure.

The charging robot according to an embodiment of the present disclosure may correspond to the robot 100a described above.

The charging robot according to an embodiment of the present disclosure may charge an object with electricity. Hereinafter, it is illustrated that the object is an electric car E by way of an example, but this should not be considered as limiting.

The charging robot may include a station 10, a multi-joint manipulator 20 provided in the station 10, and a charging connector C provided on an end of the multi-joint manipulator 20.

The station 10 may be installed on a bottom surface or a wall surface, and a size and a shape thereof is not limited.

The station 10 may have a power supply unit (not shown) embedded therein to supply power to the electric car E through the charging connector C. The power supply unit may be electrically connected with an external power source, or may be electrically connected with a battery embedded in the station 10.

The station 10 may be provided with a camera 12. The camera 12 may obtain surrounding image information of the station 10. The charging robot may detect a position of an inlet I of the electric car E to which the charging connector C is connected, based on the image information of the camera 12.

The multi-joint manipulator 20 may include a plurality of joints, and may be formed longways in a shape similar to a tube or a hose. Accordingly, the multi-joint manipulator 20 may be driven with a sufficiently large degree of freedom, and can perform a charging operation effectively even in a small space.

The multi-joint manipulator 20 may be usually stored in the station 10, and may be extended to the outside of the station 10 through an opening 11 formed on the station 10 to perform a charging operation.

The charging connector C may be provided on an end of the multi-joint manipulator 20. The charging connector C may connect to the charging inlet I (hereinafter, "inlet") of the electric car E to charge the electric car E.

The multi-joint manipulator 20 may have joints included therein ejected to the outside one by one. Each joint may pivot by a predetermined angle by a joint control mechanism, which will be described below, while being ejected to the outside of the station 10.

Accordingly, the multi-joint manipulator 20 may be ejected to the outside of the station 10 and may cause the charging connector C to access the inlet I, and finally, the charging connector C may be connected to the inlet I.

A sub camera (not shown) may further be provided on an end of the multi joint manipulator 20. Due to the sub camera, it is easier to exactly connect the charging connector C and the inlet I.

Figure 6:
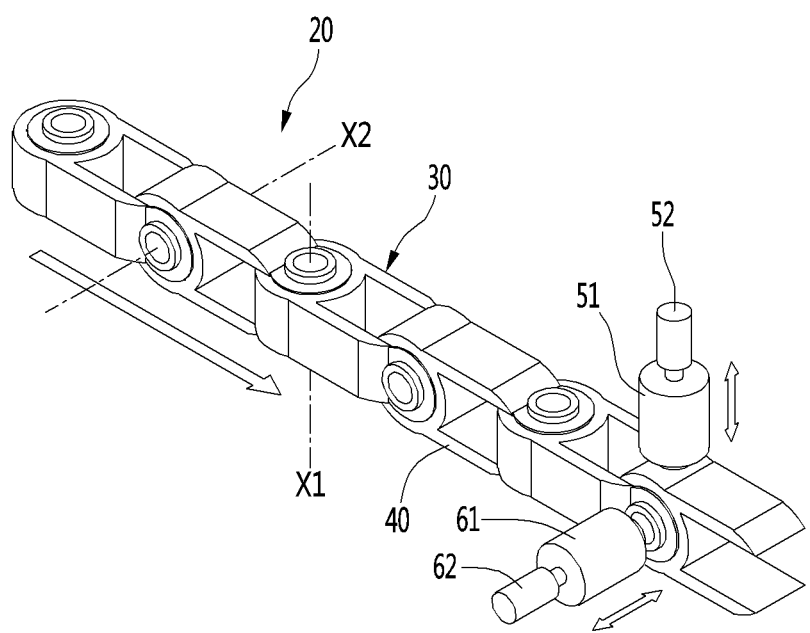
FIG. 6 is a view illustrating a multi-joint manipulator according to an embodiment of the present disclosure.

FIG. 6 is a view illustrating the multi-joint manipulator according to an embodiment of the present disclosure.

The multi-joint manipulator 20 may include a plurality of joints 30, 40. The plurality of joints 30, 40 may include a first joint 30 and a second joint 40 which have rotation axes orthogonal to each other.

The first joint 30 and the second joint 40 may be connected with each other alternately. More specifically, the first joint 30 and the second joint 40 may be arranged alternately along a longitudinal direction of the multi-joint manipulator 20. The first joint 30 may be rotatably connected to the second joint 40, and the second joint 40 may be rotatably connected to the first joint 30.

The rotation axis X1 of the first joint 30 and the rotation axis X2 of the second joint 40 may be orthogonal to each other. For example, the rotation axis X1 of the first joint 30 may be vertical, and the rotation axis X2 of the second joint 40 may be horizontal. The rotation axis X1 of the first joint 30 and the rotation axis X2 of the second joint 40 may be imaginary rotation axes.

The rotation axis X1 of the first joint 30 and the rotation axis X2 of the second joint 40 may be perpendicular to the longitudinal direction of the multi-joint manipulator 20.

The charging robot may further include a joint control mechanism 51, 52, 61, 62. The joint control mechanism 51, 52, 61, 62 may be embedded in the station 10.

The joint control mechanism 51, 52, 61, 62 may pivot each of the joints 30, 40 of the multi-joint manipulator 20 by a predetermined angle.

The multi-joint manipulator 20 may be extended to the outside of the station 10 by a manipulator moving mechanism 70 (see FIGS. 5A and 5B), which will be described below. When the multi-joint manipulator 20 moves and each joint 30, 40 reaches a set point, the driving of the manipulator moving mechanism 70 may be stopped, and the joint control mechanism 51, 52, 61, 62 may pivot the joint 30, 40 positioned at the set point by a predetermined angle.

The set point may indicate a point on an imaginary plane including a rotation shaft of a first motor 51 and a rotation shaft of a second motor 61, which will be described below. That is, the joint 30, 40 positioned at the set point may face the rotation shaft of the first motor 51 or the rotation shaft of the second motor 61. The set point may be positioned inside the station 10.

The joint control mechanism 51, 52, 61, 62 may include the first motor 51, a first actuator 52, the second motor 61, and a second actuator 62.

The first motor 51 may be connected to the first joint 40 to pivot the first joint 30 by a predetermined angle, and the first actuator 52 may connect the first motor 51 to the first joint 30.

More specifically, the first actuator 52 may include a first cylinder and a first piston which is driven by the first cylinder and is connected to the first motor 51.

The first actuator 52 may cause the first motor 51 to reciprocate in a direction parallel to the rotation axis X1 of the first joint 30. For example, the first actuator 52 may cause the first motor 51 to reciprocate vertically.

When the first joint 30 reaches the set point, the first actuator 52 may move the first motor 51 toward the first joint 30, and may connect the first motor 51, more specifically, the rotation shaft of the first motor 51, to the first joint 30.

The first motor 51 connected to the first joint 30 may pivot the first joint 30 by a predetermined angle. Thereafter, the first actuator 52 may move the first motor 51 further apart from the first joint 30, and may separate the first motor 51, more specifically, the rotation shaft of the first motor 51, from the first joint 30.

The second motor 61 may be connected the second joint 40 and may pivot the second joint 40 by a predetermined angle. The second actuator 62 may connect the second motor 61 to the second joint 40.

The second motor 61 may be connected to the second joint 40 to pivot the second joint 40 by a predetermined angle, and the second actuator 62 may connect the second motor 61 to the second joint 40.

More specifically, the second actuator 62 may include a second cylinder and a second piston which is driven with respect to the second cylinder and is connected to the second motor 61.

The second actuator 62 may cause the second motor 61 to reciprocate in a direction parallel to the rotation axis X2 of the second joint 40. For example, the second actuator 62 may cause the second motor 61 to reciprocate horizontally.

When the second joint 40 reaches the set point, the second actuator 62 may move the second motor 61 toward the second joint 40, and may connect the second motor 61, more specifically, the rotation shaft of the second motor 61, to the second joint 40.

The second motor 61 connected to the second joint 40 may pivot the second joint 40 by a predetermined angle. Thereafter, the second actuator 62 may move the second motor 61 further away from the second joint 40, and may separate the second motor 61, more specifically, the rotation shaft of the second motor 61, from the second joint 40.

FIGS. 7A to 7F are views to explain a control method of the multi-joint manipulator according to an embodiment of the present disclosure.

Figure 7A:
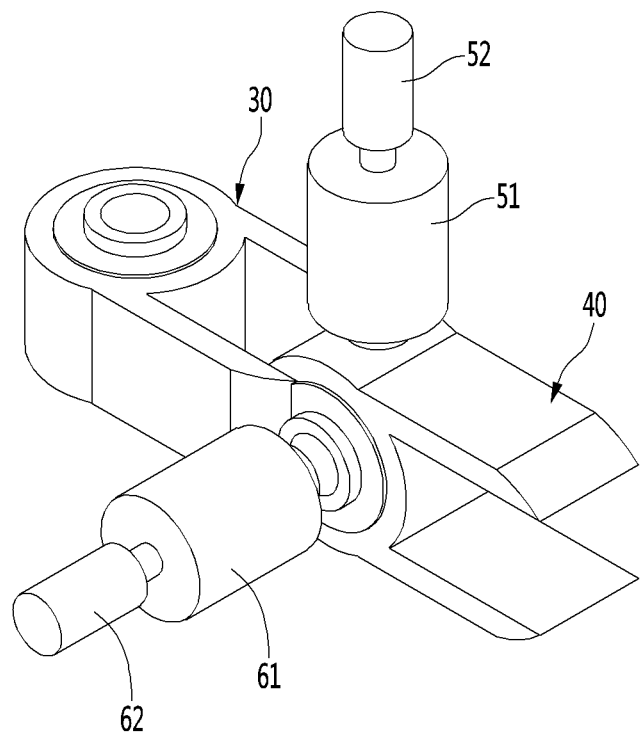
FIGS. 7A to 7F are views to explain a control method of the multi-joint manipulator according to an embodiment of the present disclosure.
Figure 7B:
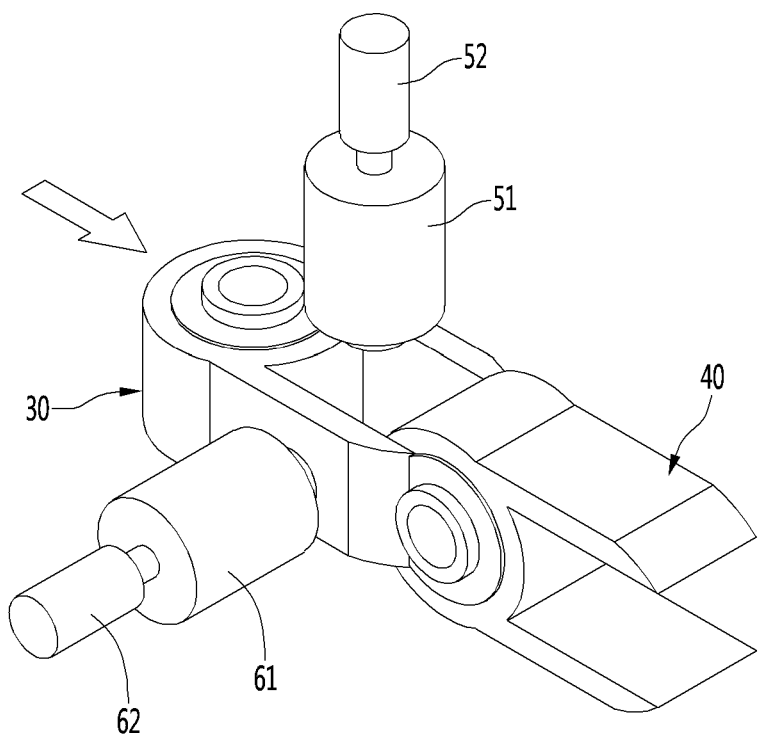
Figure 7C:
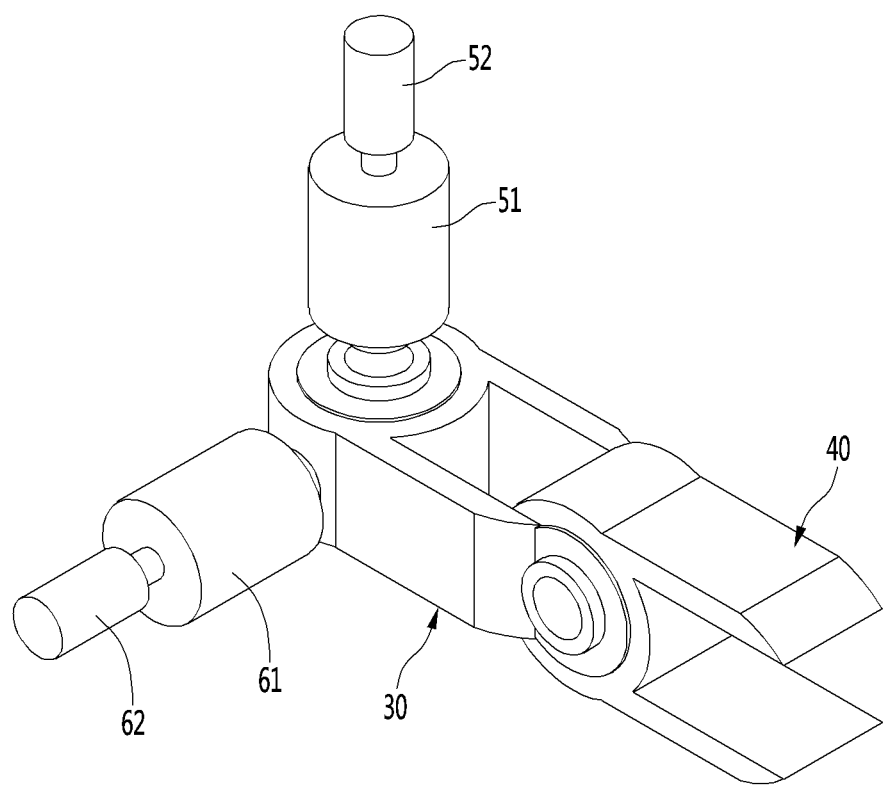
Figure 7D:
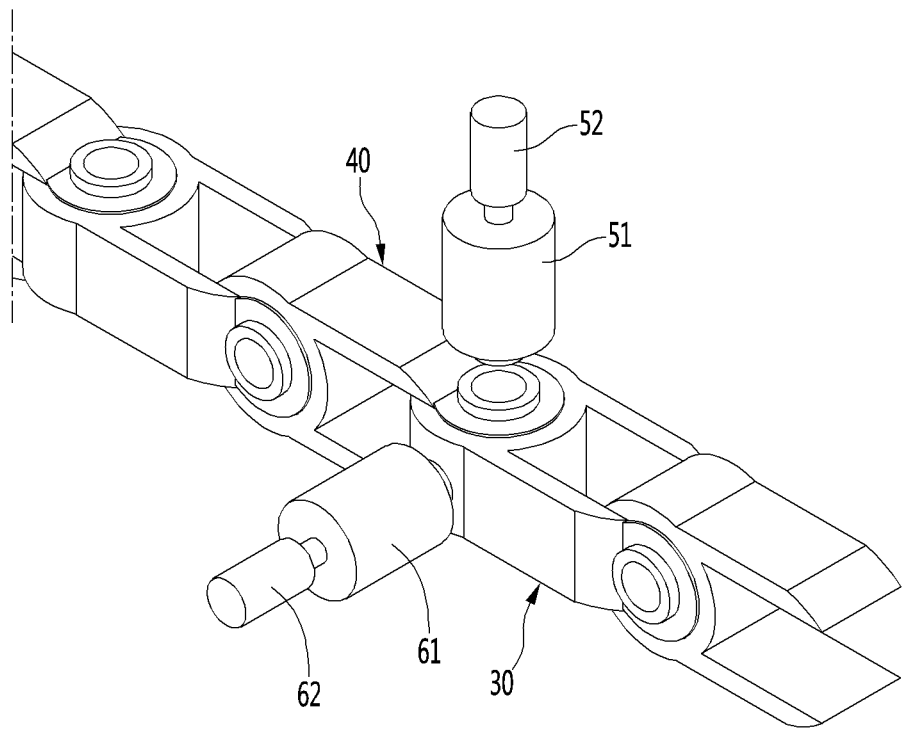
Figure 7E:
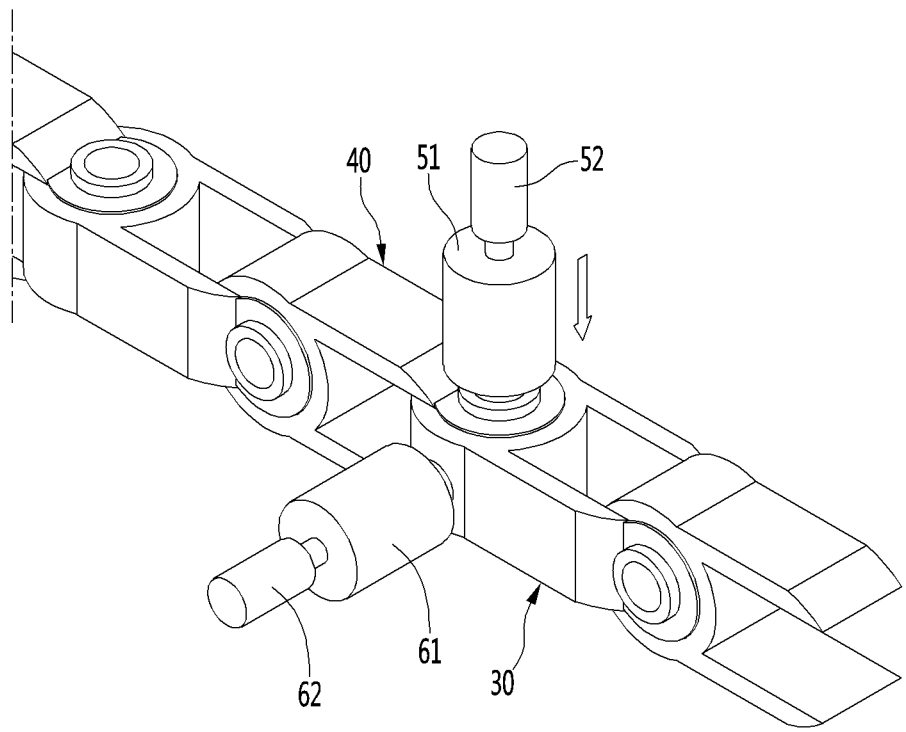
Figure 7F:
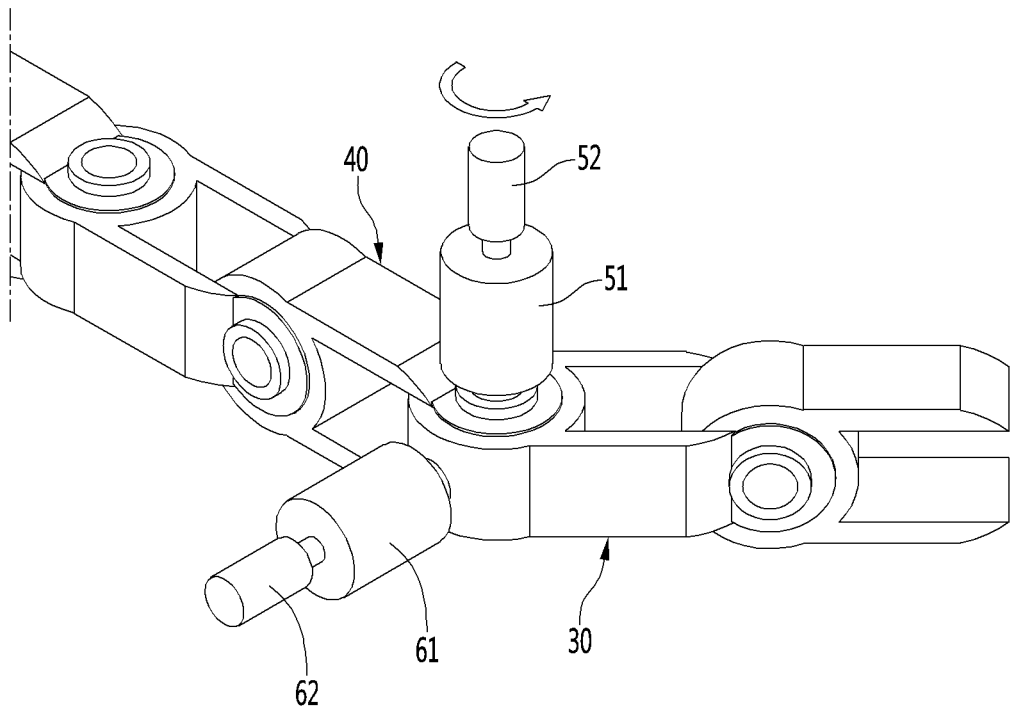

FIGS. 7A to 7C illustrate movements of the multi-joint manipulator 20 made by driving the manipulator moving mechanism 70, which will be described below, and FIGS. 7D to 7F illustrate a process of pivoting the first joint 30 by the first motor 51 and the first actuator 52. Based on this, those skilled in the art can easily understand a process of pivoting the second joint 40 by the second motor 61 and the second actuator 62.

As shown in FIG. 7A, when the manipulating moving mechanism 70 is operated with the second joint 40 being positioned at the set point, the multi-joint manipulator 20 may move as shown in FIG. 7B. The manipulator moving mechanism 70 may move the multi-joint manipulator 20 in a longitudinal direction of the multi-joint manipulator 20, for example, in a forward direction.

As shown in FIG. 7C, the manipulator moving mechanism 70 may move the multi-joint manipulator 20 until the first joint 30 reaches the set point. That is, the manipulator moving mechanism 70 may move the multi-joint manipulator 20 as long as a length of one joint 30, 40.

When the first joint 30 reaches the set point as shown in FIG. 7D, the manipulator moving mechanism 70 may temporarily stop moving the multi-joint manipulator 20. As shown in FIG. 7E, the first actuator 52 may connect the rotation shaft of the first motor 51 to the first joint 30, and as shown in FIG. 7F, the first motor 51 may pivot the first joint 30 by a predetermined angle.

Thereafter, the first actuator 52 may separate the first motor 51 from the first joint 30, the manipulator moving mechanism 70 may be re-driven and may move the multi-joint manipulator 20 until the second joint 40 reaches the set point, the second actuator 62 may connect the rotation shaft of the second motor 61 to the second joint 40, and the second motor 61 may pivot the second joint 40 by a predetermined angle. This process will be easily understood by those skilled in the art.

Figure 8A:
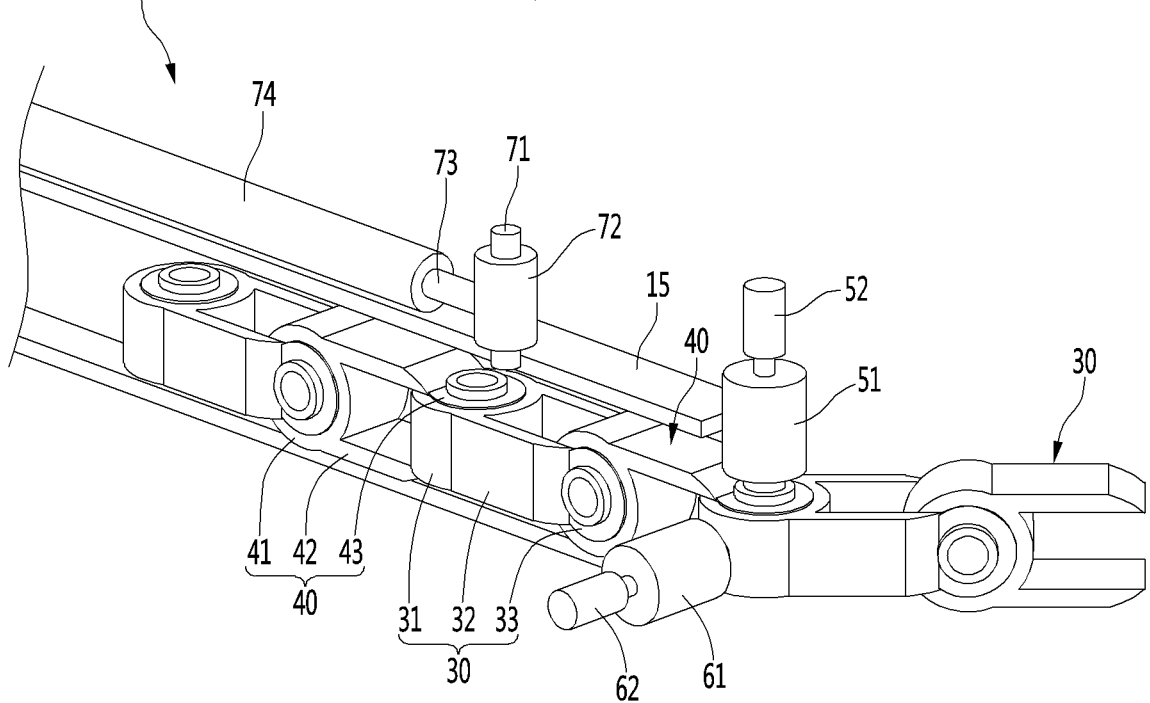
FIGS. 8A and 8B are views to explain a configuration and an action of a manipulator moving mechanism according to an embodiment of the present disclosure.
Figure 8B:
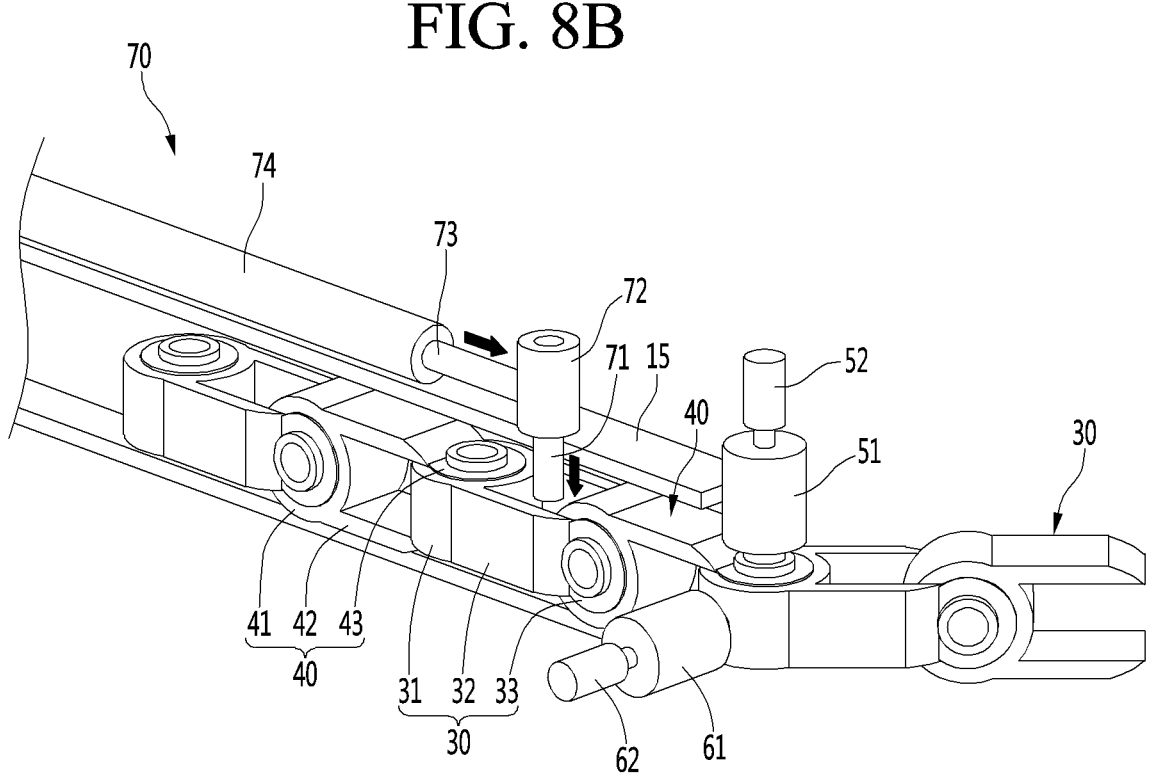

FIGS. 8A and 8B are view to explain a configuration and an action of the manipulator moving mechanism according to an embodiment of the disclosure.

Each joint 30, 40 of the multi-joint manipulator 20 may include a main body 31, 41, one pair of extension portions 32, 42, and connectors 33, 43.

The main body 31, the extension portions 32, and the connectors 33 of the first joint 30 may be referred to as a first main body, first extensions, and first connectors, respectively. The main body 41, the extension portions 42, and the connectors 43 of the second joint 40 may be referred to as a second main body, second extension portions, and second connectors, respectively.

The main body 31, 41 may have a hollow container shape having a ring or arc-like cross section.

The rotation axis X1 (see FIG. 6) of the first joint 30 may pass through the first main body 31. A center axis of the first main body 31 may coincide with the rotation axis X1 of the first joint 30. The first main body 31 may be formed longways in the direction of the rotation axis X1 of the first joint 30. The first main body 31 may be formed in a hollow container shape having an upper surface and a lower surface opened.

The rotation axis X2 (see FIG. 6) of the second joint 40 may pass through the second main body 41. A center axis of the second main body 41 may coincide with the rotation axis X2 of the second joint 40. The second main body 41 may be formed longways in the direction of the rotation axis X2 of the second joint 40. The second main body 41 may be formed in a hollow container shape having a left surface and a right surface opened.

The one pair of extension portions 32, 42 may be formed on an outer circumference of the main body 31, 41 longways in parallel to each other. The one pair of extension portions 32, 42 may be spaced apart from each other.

More specifically, the one pair of first extension portions 32 may formed on the outer circumference of the first main body 31 longways in parallel to each other. The one pair of first extension portions 32 may be spaced apart from each other in a direction orthogonal to the rotation axis X1 of the first joint 30. For example, the one pair of first extension portions 32 may be spaced apart from each other horizontally, and may be formed longways in a forward and backward direction.

The one pair of second extension portions 42 may formed on the outer circumference of the second main body 41 longways in parallel to each other. The one pair of second extension portions 42 may be spaced apart from each other in a direction orthogonal to the rotation axis X2 of the second joint 40. For example, the one pair of second extension portions 42 may be spaced apart from each other vertically, and may be formed longways in the forward and backward direction.

The connectors 33, 43 may be formed on ends of the extension portions 32, 42.

More specifically, the first connectors 33 may be formed on ends of the first extension portions 32, and may be connected to the second main body 41. The second main body 41 may be positioned between the one pair of first connectors 33.

The second connectors 43 may be formed ends of the second extension portions 42, and may be connected to the first main body 31. The first main body 31 may be positioned between the one pair of second connectors 43.

That is, the main body 31 of one first joint 30 may be connected to the connectors 43 of one second joint 40, and the connectors 33 of the one first joint 30 may be connected to the main body 41 of another second joint 40.

Likewise, the main body 41 of one second joint 40 may be connected to the connectors 33 of one first joint 30, and the connectors 43 of the one second joint 40 may be connected to the main body 31 of another first joint 30.

The charging robot may include the manipulator moving mechanism 70.

The manipulator moving mechanism 70 may be embedded in the station 10.

The manipulator moving mechanism 70 may move the multi-joint manipulator 20 to the outside of the station 10, or may return the multi-joint manipulator 20 to the inside of the station 10.

The manipulator moving mechanism 70 may move the multi-joint manipulator 20 in the longitudinal direction of the multi-joint manipulator 20, for example, forwards and backwards.

More specifically, the manipulator moving mechanism 70 may include a locking piston 71, a moving cylinder 72, a connection piston 73, and a fixing cylinder 74.

The locking piston 71 may be locked into the multi-joint manipulator 20. More specifically, the locking piston 71 may be locked into the first joint 30 or the second joint 40. Hereinafter, a case in which the locking piston 71 is locked into the first joint 30 will be described by way of an example.

The locking piston 71 may be inserted between the one pair of extension portions 32 of the first joint 30. The locking piston 71 may be formed longways in a direction parallel to the rotation axis X1 (see FIG. 6) of the first joint 30.

The moving cylinder 72 may insert the locking piston 71 between the one pair of extension portions 32 of the first joint 30. The moving cylinder 72 may cause the locking piston 71 to reciprocate in the direction parallel to the rotation axis X1 of the first joint. The moving cylinder 72 may move along the connection piston 73.

The connection piston 73 may be connected to the moving cylinder 72 and may move the moving cylinder 72. The connection piston 73 may be formed longways in the direction parallel to the longitudinal direction of the multi-joint manipulator 20, and may be formed longways in a direction orthogonal to the longitudinal direction of the locking piston 71.

The fixing cylinder 74 may be fixed inside the station 10. For example, the fixing cylinder 74 may be fixed to an outside of a guide 15, which will be described below.

The fixing cylinder 74 may move the connection piston 73 in parallel to the moving direction of the multi-joint manipulator 20. For example, the fixing cylinder 74 may cause the connection piston 73 to reciprocate forwards and backwards.

Hereinafter, an action when the manipulator moving mechanism 70 moves the multi-joint manipulator 20 to the outside of the station 10 will be described.

The moving cylinder 72 may insert the locking piston 71 between the one pair of extension portions 32 of any one first joint 30, and the fixing cylinder 74 may move the connection piston 73 forwards. Accordingly, the locking piston 71 and the moving cylinder 72 may move forwards along with the connection piston 73, and the locking piston 71 may push the main body 41 of the second joint 40 connected to the connectors 33 of the one first joint 30. Accordingly, the multi-joint manipulator 20 may move forwards by a predetermined distance.

Thereafter, the moving cylinder 72 may draw out the locking piston 71 from the one pair of extension portions 32 of the first joint 30. The fixing cylinder 74 may move the connection piston 73 backwards, and the moving cylinder 72 and the locking piston 71 may move over another first joint 30 positioned behind the one first joint 30. Thereafter, the moving cylinder 72 may insert the locking piston 71 between the one pair of extension portions 32 of the another first joint 30, and the fixing cylinder 74 may move the connection piston 73 forwards. Accordingly, the multi-joint manipulator 20 may further move forwards by a predetermined distance.

By repeating this process, the manipulator moving mechanism 70 may move the multi-joint manipulator 20 to the outside of the station 10.

Hereinafter, an action when the manipulator moving mechanism 70 returns the multi-joint manipulator 20 to the inside of the station 10 will be described.

The moving cylinder 72 may insert the locking piston 71 between the one pair of extension portions 32 of any one first joint 30, and the fixing cylinder 74 may move the connection piston 73 backwards. Accordingly, the locking piston 71 and the moving cylinder 72 may move backwards along with the connection piston 73, and the locking piston 71 may pull the main body 31 of the one first joint 30. Accordingly, the multi-joint manipulator 20 may move backwards by a predetermined distance.

Thereafter, the moving cylinder 72 may draw out the locking piston 71 from the one pair of extension portions 32 of the first joint 30. The fixing cylinder 74 may move the connection piston 73 forwards, and the moving cylinder 72 and the locking piston 71 may move over another first joint 30 positioned in front of the one first joint 30. Thereafter, the moving cylinder 72 may insert the locking piston 71 between the one pair of extension portions 32 of the another first joint 30, and the fixing cylinder 74 may move the connection piston 73 backwards. Accordingly, the multi-joint manipulator 20 may further move backwards by a predetermined distance.

By repeating this process, the manipulator moving mechanism 70 may return the multi-joint manipulator 20 to the inside of the station 10.

The charging robot may include the guide 15 for guiding the movement of the multi-joint manipulator 20.

The guide 15 may be embedded in the station 10. The guide 15 may be formed longways in the longitudinal direction of the multi-joint manipulator 20.

The guide 15 may have a pipe shape, but is not limited hereto.

The moving cylinder 72, the connection piston 73, and the fixing piston 74 may be positioned outside the guide 15. In this case, the guide 15 may have an opening formed thereon to allow the locking cylinder 71 to pass therethrough. The opening may be formed longways in the moving direction of the multi-joint manipulator.

In addition, the set point described above may be positioned after an end of the guide 15 with respect to the moving direction of the multi-joint manipulator 20. More specifically, the set point may be positioned outside the guide 15, and preferably, may be positioned right after the end of the guide 15. That is, the joint control mechanism 51, 52, 61, 62 may be positioned right after the end of the guide 15.

Although not shown in the drawings, the first actuator 52 and the second actuator 62 may be fixed to the guide 15.

Figure 9A:
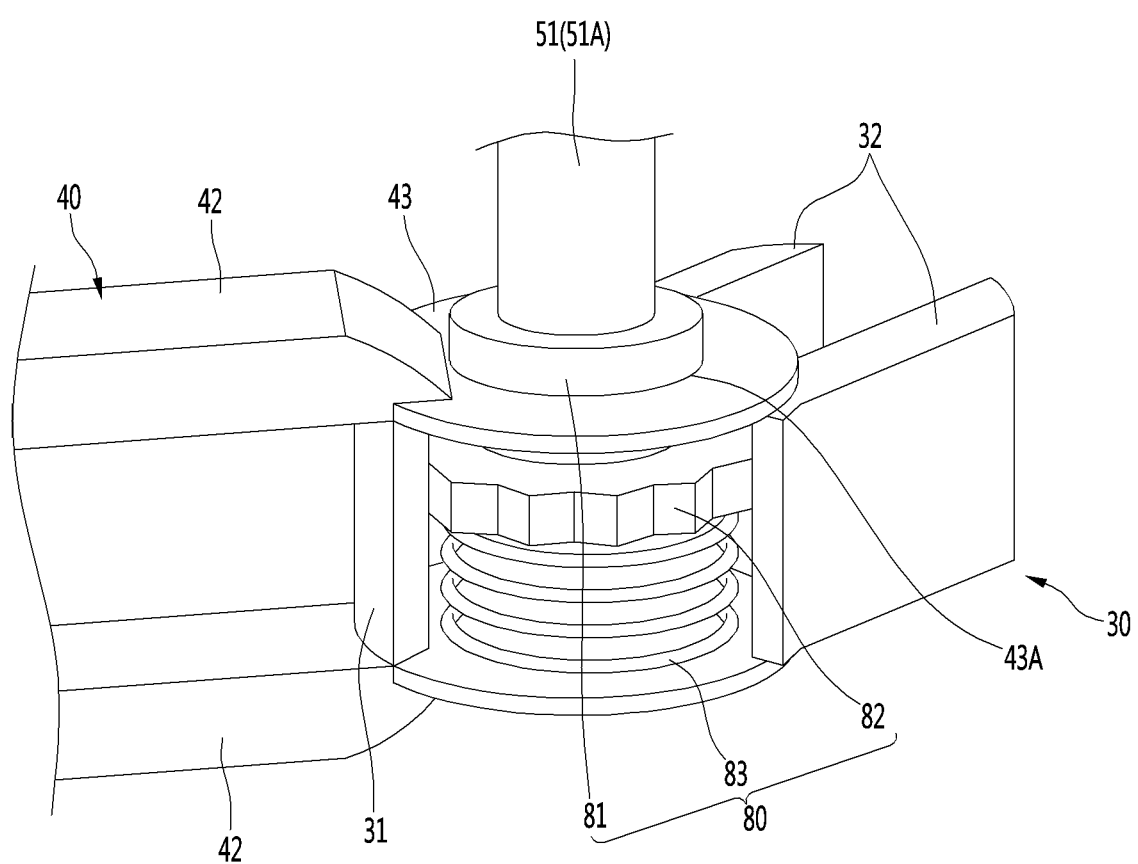
FIGS. 9A to 9C are views to explain a configuration and an action of a clutch according to an embodiment of the present disclosure.
Figure 9B:
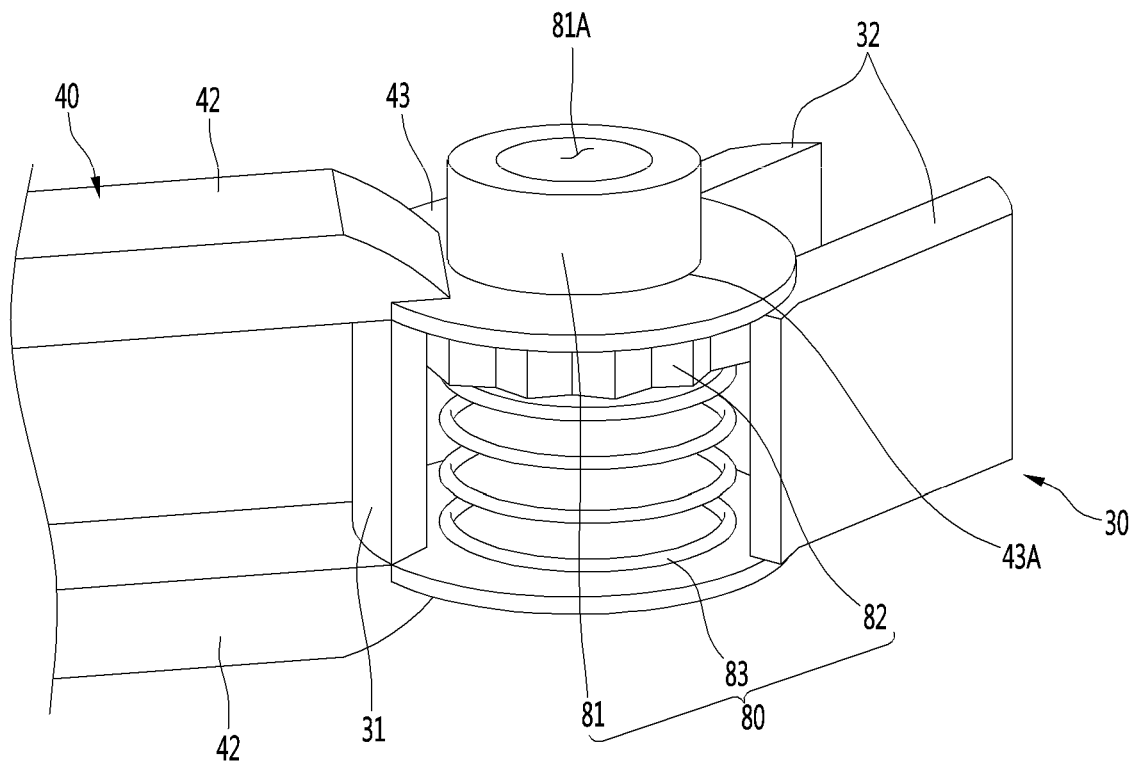
Figure 9C:
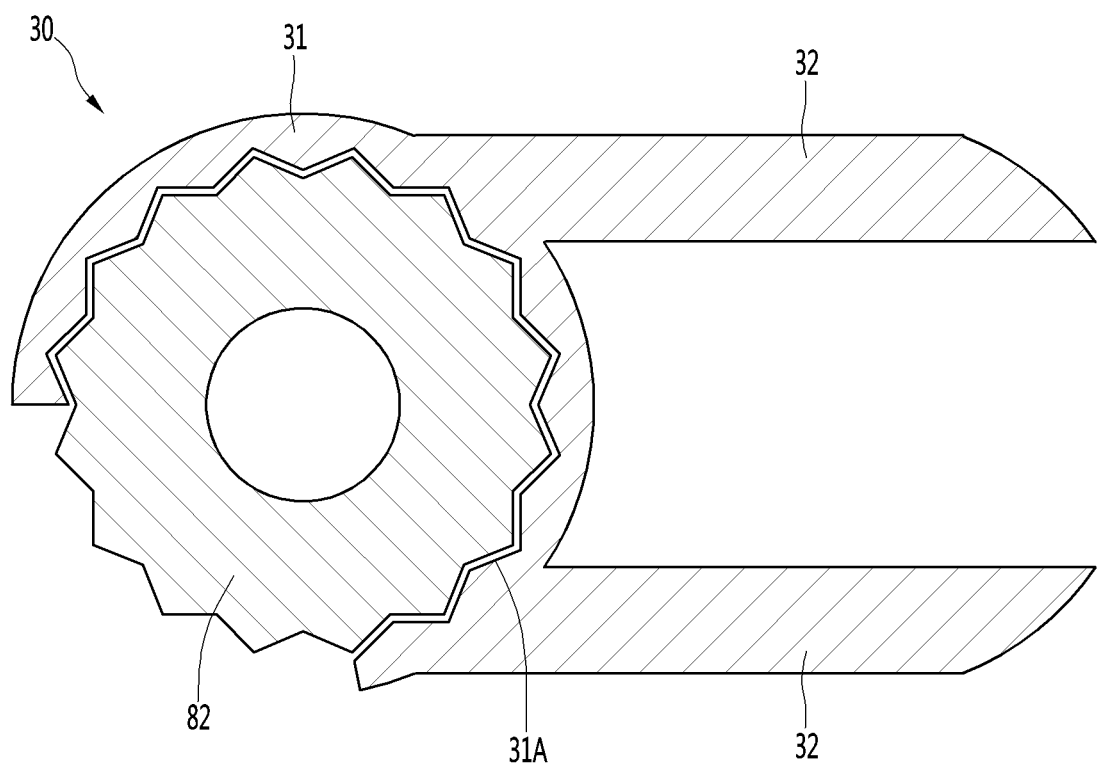

FIGS. 9A to 9C are views to explain a configuration and an action of a clutch according to an embodiment of the present disclosure.

Each joint 30, 40 of the multi-joint manipulator 20 may further include a clutch 80.

The clutch 80 may regulate a pivotal movement of the joint 30, 40 to maintain the joint 30, 40 pivoted by a predetermined angle by the first motor 51 or the second motor 61 at the predetermined angle.

Hereinafter, the clutch 80 included in the first joint 30 will be described. However, based on this, those skilled in the art can easily understand a configuration and an action of the clutch 80 included in the second joint 40.

More specifically, the clutch 80 may include a motor connection portion 81, a clutch gear 82, and a clutch elastic member 83.

The first motor 51, more specifically, the rotation shaft 51A of the first motor 51, may be connected to the motor connection portion 81. The motor connection portion 81 may have a substantially cylindrical shape. The motor connection portion 81 may have a rotation shaft insertion hole 81A formed therein to allow the rotation shaft 51A of the first motor 51 to be inserted thereinto.

The motor connection portion 81 may penetrate through the connectors 43 of the second joint 40. More specifically, a penetrating hole 43A may be formed on at least one of the one pair of connectors 43 of each joint to allow the motor connection portion 81 to pass therethrough.

The clutch gear 82 may rotate along with the motor connection portion 81. Preferably, the clutch gear 82 may be integrally formed with the motor connection portion 81.

The clutch gear 82 may be positioned inside the main body 31 of the first joint 30. The clutch gear 82 may be teeth-engaged with an inner gear 31A formed on an inner surface of the main body 31 of the first joint 30. Accordingly, a relative rotation may not be generated between the clutch gear 82 and the first joint 30, and a rotational force of the first motor 51 can be smoothly transmitted to the first joint 30.

The clutch elastic member 83 may be positioned inside the main body 31 of the first joint 30. The clutch elastic member 83 may press the clutch gear 82 toward the connector 43. More specifically, the motor connection portion 81 may penetrate through any one of the one pair of connectors 43, and the clutch elastic member 83 may be provided in a compressed state between the other connector 43 and the clutch gear 82.

One surface of the clutch gear 82 may be in close contact with an inner surface of the one connector 43 by the elastic force of the clutch elastic member 83, and in this case, the rotation of the clutch gear 82 may be regulated.

For example, a regulation projection may be formed on any one of the one surface of the clutch gear 82 and the inner surface of the one connector 43, and a regulation recess may be formed the other one to allow the regulation projection to be locked thereinto.

In another example, friction portions may be formed on the one surface of the clutch gear 82 and the inner surface of the one connector 43 to be in contact with each other to generate a high friction.

Hereinafter, an action of the clutch 80 will be described.

When the first actuator 52 moves the first motor 51 toward the first joint 30, the rotation shaft 51A of the first motor 51 may be connected to the motor connection portion 81, and mat press the motor connection portion 81, and the clutch elastic member 83 may be compressed. Accordingly, the one surface of the clutch gear 82 may be spaced apart from the inner surface of the one connector 43.

In this state, when the first motor 51 rotates, the rotational force of the first motor 51 may be transmitted to the first joint 30 through the motor connection portion 81 and the clutch gear 82, such that the first joint 30 rotates.

When the first actuator 52 separates the first motor 51 from the first joint 30 after the first joint 30 pivots by a predetermined angle, the one surface of the clutch gear 82 may come into close contact with the inner surface of the one connector 43 by the elastic force of the clutch elastic member 83. Accordingly, the rotation of the clutch gear 82 and the first joint 30 may be regulated, and the first joint 30 may remain as being pivoted by the predetermined angle.

Figure 10A:
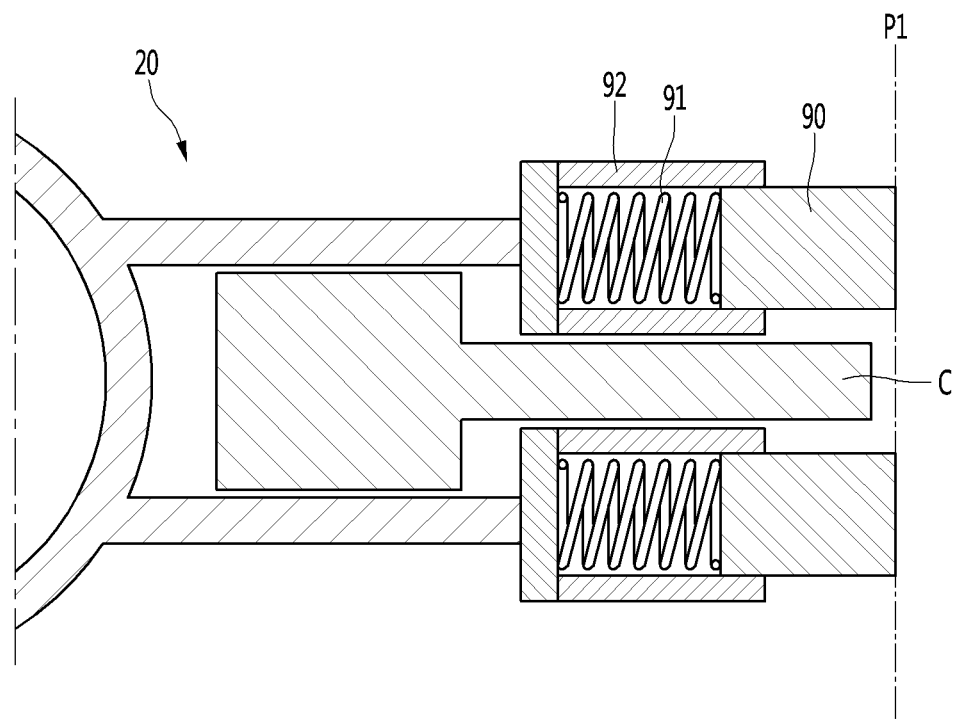
FIGS. 10A and 10B are views to explain a configuration and an action of a safety sensor according to an embodiment of the present disclosure.
Figure 10B:
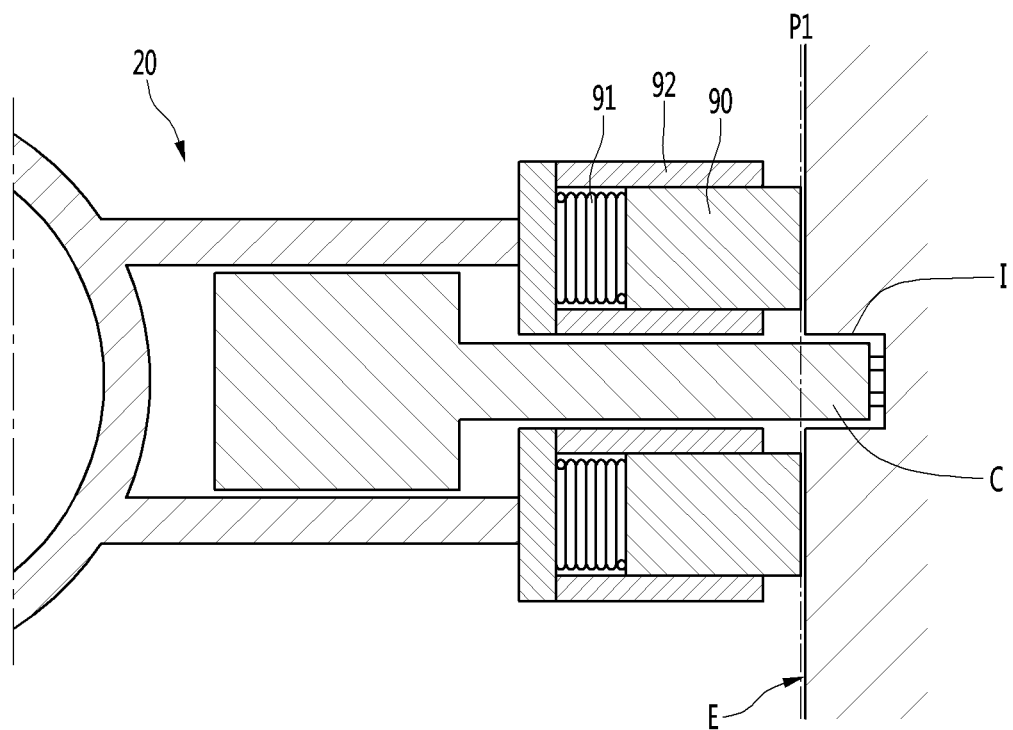

FIGS. 10A and 10B are views to explain a configuration and an action of a safety sensor according to an embodiment of the present disclosure.

The charging robot may include a safety sensor 90 provided on an end of the multi-joint manipulator 20. The safety sensor 90 may detect an object such as a person, an obstacle, or the like.

The safety sensor 90 may include at least one of a collision detection sensor or a proximity sensor.

When a person or an obstacle is detected by the safety sensor 90, the movement of the multi-joint manipulator 20 may be immediately stopped. More specifically, when a person or an obstacle is detected by the safety sensor 90, an action of at least one of the manipulator moving mechanism 20, the first motor 52, the first actuator 51, the second motor 62, and the second actuator 61 may be stopped.

Accordingly, the multi-joint manipulator 20 can be prevented from colliding with the obstacle and being damaged, and a risk that the multi-joint manipulator 20 hits a person and the person is injured can be prevented.

The safety sensor 90 may move in parallel to a longitudinal direction of the charging connector C. More specifically, the safety sensor 90 may be movable between a first position P1 further protruding forward than the charging connector C, and a second position P2 positioned behind the first position P1.

A sensor guide 92 may be provided on an end of the multi-joint manipulator 20 to guide a movement of the safety sensor 90, and a sensor elastic member 91 may be positioned inside the sensor guide 92 to press the safety sensor 90 toward the first position P1.

The sensor guide 92 may guide forward and backward movements of the safety sensor 90. The sensor guide 92 may have an inner space formed therein to receive the safety sensor 90.

The sensor elastic member 91 may be a coil spring. The sensor elastic member 91 may be disposed inside the sensor guide 92. The sensor elastic member 91 may be positioned between an inner surface of the sensor guide 92 and the safety sensor 90.

The safety sensor 90 may be normally positioned at the first position P1. Since the first position P further protrudes forward than the end of the charging connector C, the safety sensor 90 may detect a person or an obstacle before the charging connector C collides with the person or the obstacle.

When the charging connector C approaches the inlet I of the electric car E, the safety sensor 90 may be pressed by a peripheral portion of the inlet I and may move to the second position P2, and the sensor elastic member 91 may be compressed. Since the second position P2 is positioned behind the end of the charging connector C, the charging connector C may be smoothly connected to the inlet I.

When charging of the electric car E is completed and then the charging connector C is separated from the inlet I of the electric car E and moves further away therefrom, the safety sensor 90 may move back to the first position P1 due to the elastic force of the sensor elastic member 91.

Figure 11:
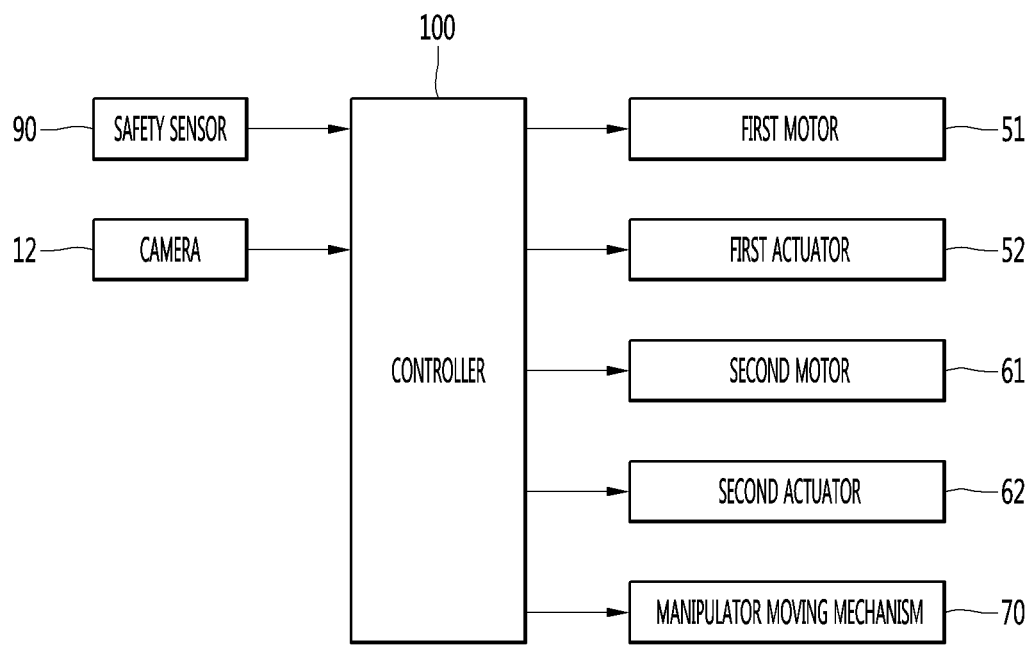
FIG. 11 is a control configuration diagram of the charging robot according to an embodiment of the present disclosure.

FIG. 11 is a control configuration diagram of the charging robot according to an embodiment of the present disclosure.

The charging robot according to an embodiment of the present disclosure may include a controller 100 to control an overall operation of the charging robot.

The controller 100 may receive a result of detecting by the safety sensor 90.

The controller 100 may receive image information of the camera 12. In addition, the controller 100 may receive image information of a sub camera when the sub camera is provided on an end of the multi-joint manipulator 20.

The controller 100 may control the first motor 51, the first actuator 52, the second motor 61, the second actuator 62, and the manipulator moving mechanism 70. It is obvious that elements controllable by the controller 100 may be added, removed, and changed.

Figure 12:
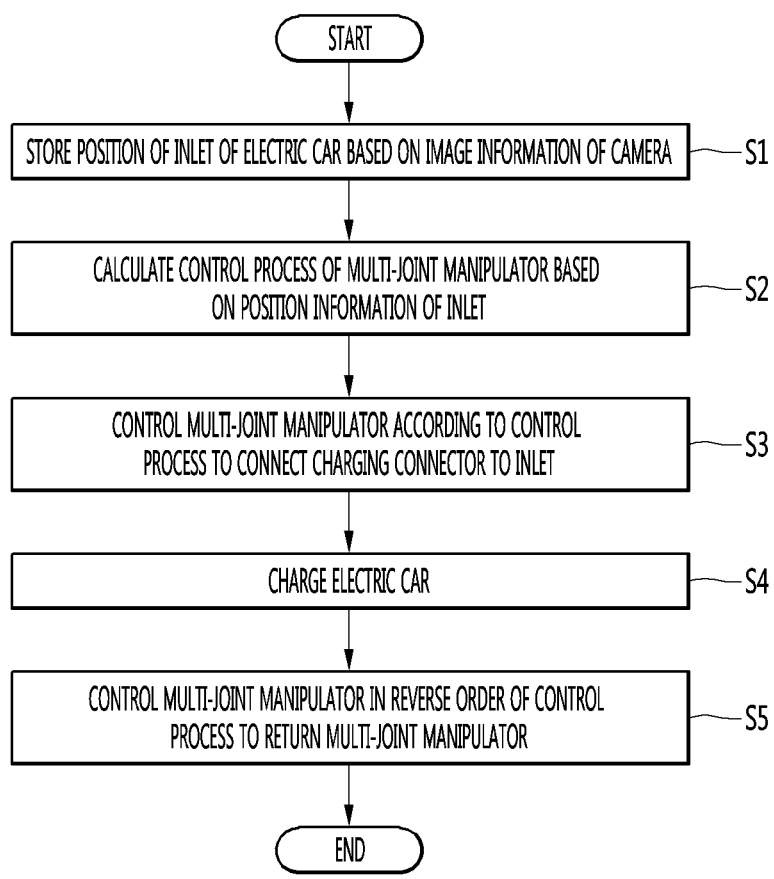
FIG. 12 is a flowchart illustrating a schematic control sequence of the charging robot according to an embodiment of the present disclosure.

FIG. 12 is a flowchart illustrating a schematic control sequence of the charging robot according to an embodiment of the present disclosure.

A control method of the charging robot according to an embodiment of the present disclosure may include a position detection step S1, a control process calculation step S2, a connection step S3, a charging step S4, and a returning step S5.

The position detection step S1 is a step of detecting position information of the inlet I of the electric car E based on image information of the camera 12. The camera 12 may obtain image information including position information of the inlet I of the electric car E, and the controller 100 may receive the image information.

The control process calculation step S2 is a step of calculating a control process of the multi-joint manipulator 20 according to the position information of the inlet I of the electric car E.

More specifically, the controller 100 may calculate a control process of the multi-joint manipulator 20 based on the position information of the inlet I included in the received image information. The control process may include information regarding the number of joints 30, 40 which need to be controlled until the charging connector C connects to the inlet I, and information regarding a pivotal angle required for each joint 30, 40.

The connection step S3 is a step of controlling the multi-joint manipulator 20 to connect the charging connector C to the inlet I according to the control process.

More specifically, the controller 100 may control the manipulator moving mechanism 70, the first motor 51, the first actuator 52, the second motor 61, and the second actuator 62, respectively, according to the control process. Accordingly, the multi-joint manipulator 20 may move to the outside of the station 10 and the charging connector C may approach the inlet I, and finally, the charging connector C may be connected to the inlet I.

When a person or an obstacle is detected in the middle of the connection step S3, the movement of the multi-joint manipulator 20 may be stopped. More specifically, when a person or an obstacle is detected by the safety sensor 90 in the middle of the connection step S3, the controller 100 may immediately stop operating at least one of the manipulator moving mechanism 70, the first motor 51, the first actuator 52, the second motor 61, and the second actuator 62.

However, when a distance between the charging connector C and the inlet I is shorter than a set distance, the movement of the multi-joint manipulator 20 may not be stopped regardless of a result of detecting by the safety sensor 90.

More specifically, the controller 100 may calculate a distance between the charging connector C and the inlet I based on image information of the camera 12 or the sub camera provided on the end of the multi-joint manipulator 20.

When the distance between the charging connector C and the inlet I is shorter than the set distance, the safety sensor 90 may detect the peripheral portion of the inlet I. Since the peripheral portion of the inlet I is not an obstacle, the result of detecting should be disregarded in order to normally connect the charging connector C to the inlet I.

Accordingly, when the distance between the charging connector C and the inlet I is shorter than the set distance, the controller 100 may control at least one of the manipulator moving mechanism 70, the first motor 51, the first actuator 52, the second motor 61, and the second actuator 62 to connect the charging connector C to the inlet I regardless of a result of detecting by the safety sensor 90.

The charging step S4 is a step of charging the electric car E through the charging connector C connected to the inlet I. More specifically, the controller 100 may control the power supply unit embedded in the station 10 to supply power to the electric car E through the charging connector C.

The returning step S5 is a step of, when the charging of the electric car E is completed, controlling the multi-joint manipulator 20 in reverse order of the control process to return the multi-joint manipulator 20 to an original position.

More specifically, when the charging of the electric car E is completed or a charging stop command is transmitted, the controller 100 may control the multi-joint manipulator 20 in reverse order of the control process. Accordingly, the multi-joint manipulator 20 may return to the inside of the station 10 along the path that the multi-joint manipulator 20 has taken at the connection step S3.

Figure 13:
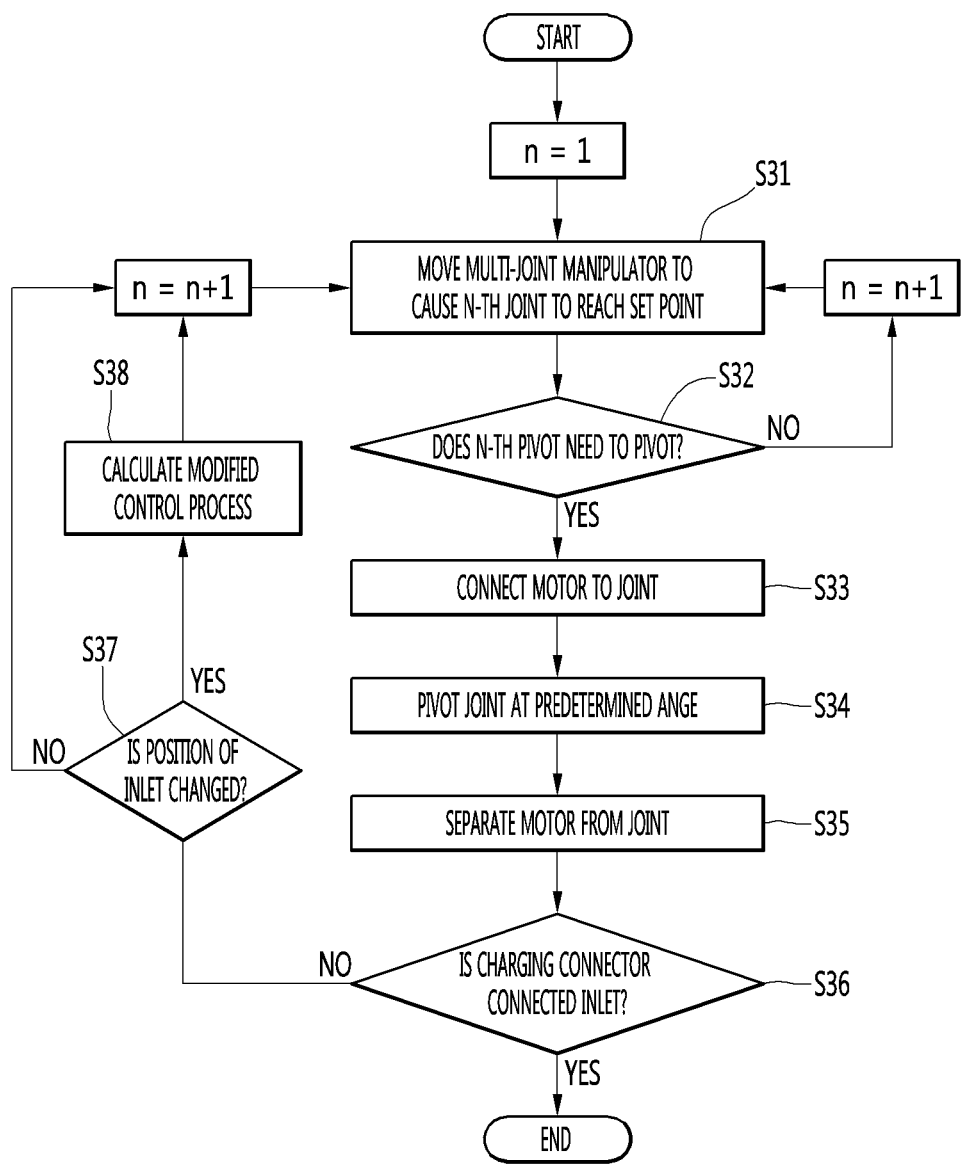
FIG. 13 is a flowchart illustrating a schematic control sequence of the multi-joint manipulator according to an embodiment of the present disclosure.

FIG. 13 is a flowchart illustrating a schematic control sequence of the multi-joint manipulator according to an embodiment of the present disclosure.

Hereinafter, a control sequence of the multi-joint manipulator 20 at the connection step S3 will be described in detail. Based on this, those skilled in the art can easily understand a control sequence of the multi-joint manipulator 20 at the returning step S5.

The connection step S3 may include a pushing process S31 of moving, by the manipulator moving mechanism 70, the multi-joint manipulator 20 until one joint 30, 40 of the multi-joint manipulator 20 reaches a set point. The connection step S3 may include a motor connection process S33 of connecting the motor 51, 61 to the one joint 30, 40 positioned at the set point. The connection step S3 may include a pivoting process S34 of pivoting, by the motor 51, 61, the one joint 30, 40 by a predetermined angle. The connection step S3 may include a motor separation process S35 of separating the motor 51, 61 from the one joint 30, 40. The connection step S3 may further include a re-pushing process S31 of, after the motor 51, 61 is separated from the one joint 30, 40, moving, by the manipulator moving mechanism 70, the multi-joint manipulator 20 until another joint 30, 40 connected to the one joint 30, 40 reaches the set point.

Hereinafter, the control method will be described in more detail.

The controller 100 may control the manipulator moving mechanism 70 to cause one joint of the multi-joint manipulator 20 to reach the set point described above (S31).

The one joint right after the connection step S3 starts may be the first joint, and the first joint may refer to a joint that is closest to the charging connector C among the plurality of joints 30, 40 included in the multi-joint manipulator 20.

When the one joint 30, 40 does not need to pivot, the controller 100 may control the manipulator moving mechanism 70 to cause the next joint connected to the one joint to reach the set point (S32), (S31).

When the one joint needs to pivot, the controller 100 may control the actuator 52, 62 to connect the motor 51, 61 to the one joint (S32), (S33). More specifically, when the one joint is the first joint 30, the first controller 100 may control the first actuator 52 to connect the first motor 51 to the one joint. On the other hand, when the one joint is the second joint 40, the controller 100 may control the second actuator 62 to connect the second motor 61 to the one joint.

When the motor 51, 61 is connected to the one joint, the controller 100 may control the motor 51, 61 to pivot the one joint by a predetermined angle according to the control process (S34).

When the pivoting of the one joint is completed, the controller 100 may control the actuator 52, 62 to separate the motor 51, 61 from the one joint (S35).

When the charging connector C is connected to the inlet I of the electric car E, the connection step S3 may finish.

When the position of the inlet I is changed before the charging connector C is connected to the inlet I of the electric car E, the controller 100 may modify the original control process and may calculate a modified control process (S36), (S37), (S38). Thereafter, the controller 100 may control the manipulator moving mechanism 70 to cause the next joint connected to the one joint to reach the set point (S31), and may control the multi-joint manipulator 20 according to the modified control process. In addition, at the returning step S5 thereafter, the controller 100 may control the multi-joint manipulator 20 in revere order of the modified control process to return the multi-joint manipulator 20 to the original position.

On the other hand, when the position of the inlet I is not changed before the charging connector C is connected to the inlet I of the electric car E, the controller 100 may control the manipulator moving mechanism 70 to cause the next joint connected to the one joint to reach the set point (S36), (S37), (S31).

Thereafter, the controller 100 may repeat the above-described process until the charging connector C is connected to the inlet I. Accordingly, the charging connector C can be reliably connected to the inlet I.

According to preferred embodiments of the present disclosure, the multi-joint manipulator includes a plurality of first and second joints which have rotation axes orthogonal to each other and are connected to each other alternately. Accordingly, the multi-joint manipulator can easily perform a charging operation even in a small space.

In addition, each joint can have its angle adjusted by the first motor or the second motor before the joint is ejected from the station. Accordingly, the range of motion of the multi-joint manipulator outside the station can be minimized, and a risk that the multi-joint manipulator collides with an obstacle or a person can be minimized.

In addition, the first or second motor may be connected to/separated from the first or second joint by the first or second actuator. Accordingly, the first and second joints having the rotation axes orthogonal to each other can smoothly pivot at the set point.

In addition, each joint of the multi-joint manipulator may pass through the set point and move to the outside of the station, or return to the inside of the station by the manipulator moving mechanism and the guide. Accordingly, the multi-joint manipulator can automatically connect to the inlet of the electric car or can automatically be disconnected and return.

In addition, the clutch regulates a pivotal movement of the joint to maintain the joint pivoted by a predetermined angle by the first or second motor at the predetermined angle. Accordingly, the multi-joint manipulator can reliably connect to the inlet.

In addition, the safety sensor may be provided on the end of the multi-joint manipulator. Accordingly, the multi-joint manipulator and the charging connector provided on the end thereof can be prevented from colliding with an obstacle or a person.

In addition, the safety sensor is movable between the first position further protruding forward than the charging connector, and the second position positioned behind the first position. Accordingly, the safety sensor can detect an obstacle or a person before the charging connector collides with the obstacle or person, and does not hinder the charging connector from connecting to the inlet.

In addition, the camera may be provided in the station or on the end of the multi-joint manipulator. Accordingly, the charging robot can exactly detect the position of the inlet of the electric car.

The technical concept of the present disclosure has been described by way of an example, and it will be understood by those skilled in the art that various modification and changes can be made without departing from the spirit and scope of the present disclosure.

Therefore, embodiments of the present disclosure are not intended to limit the technical concept of the present disclosure, and are just to describe the present disclosure, and the scope of the technical concept of the present disclosure is not limited by the embodiments.

The right scope of the present disclosure should be interpreted based on the appended claims, and all technical concepts within the scope equivalent thereto should be interpreted as being included in the right scope of the present disclosure.

What is claimed is:

1. A charging robot comprising:
   a station;
   a multi-joint manipulator comprising a plurality of first joints and a plurality of second joints which have rotation axes orthogonal to each other and are connected with each other alternately, the joint manipulator being provided on the station;
   a charging connector provided on an end of the multi-joint manipulator;
   a manipulator moving mechanism configured to move the multi-joint manipulator to an outside of the station;
   a first motor configured to pivot the first joint by a predetermined angle when the first joint is positioned at a set point;
   a first actuator configured to move the first motor toward the first joint and to connect the first motor to the first joint when the first joint is positioned at the set point;
   a second motor configured to pivot the second joint by a predetermined angle when the second joint is positioned at the set point; and a second actuator configured to move the second motor toward the second joint and to connect the second motor to the second joint when the second joint is positioned at the set point.

2. The charging robot of claim 1, further comprising a guide configured to guide a movement of the multi-joint manipulator by the manipulator moving mechanism, and embedded in the station.

3. The charging robot of claim 2, wherein the set point is positioned after an end of the guide with respect to a moving direction of the multi-joint manipulator.

4. The charging robot of claim 1, wherein each of the first joint and the second joint comprises:
   a main body rotating about the rotation axis;
   one pair of extension portions extended from an outer circumference of the main body longways in parallel to each other; and
   one pair of connectors formed on ends of the one pair of extension portions,
   wherein the main body of the first joint is connected to the connector of the second joint, and
   wherein the main body of the second joint is connected to the connector of the first joint.

5. The charging robot of claim 4, wherein the manipulator moving mechanism comprises:
   a locking piston configured to be locked into the first joint or the second joint;
   a moving cylinder configured to insert the locking piston between the one pair of extension portions;
   a connection piston disposed in parallel to a longitudinal direction of the multi-joint manipulator and connected to the moving cylinder; and
   a fixing cylinder configured to move the connection piston in a direction parallel to a moving direction of the multi-joint manipulator.

6. The charging robot of claim 5, wherein each of the first joint and the second joint further comprises:
   a motor connection portion having the first motor or the second motor connected thereto, and penetrating through the connector;
   a clutch gear rotating along with the motor connection portion and teeth-engaged with an inner gear formed on an inner surface of the main body; and
   a clutch elastic member disposed inside the main body, and configured to press the clutch gear toward the connector.

7. The charging robot of claim 1, further comprising:
   a safety sensor provided on an end of the multi-joint manipulator; and
   a controller configured to stop at least one of the manipulator moving mechanism, the first motor, the first actuator, the second motor, and the second actuator when a person or an obstacle is detected by the safety sensor.

8. The charging robot of claim 7, wherein the safety sensor is movable between a first position further protruding forward than the charging connector, and a second position which is behind the first position.

9. The charging robot of claim 8, further comprising:
   a sensor guide provided on an end of the multi-joint manipulator and configured to guide a movement of the safety sensor; and
   a sensor elastic member positioned within the sensor guide and configured to press the safety sensor toward the first position.

10. The charging robot of claim 7, further comprising a camera provided on at least one of the station or an end of the multi-joint manipulator.

11. The charging robot of claim 10, wherein, when a distance between the charging connector and an inlet to which the charging connector is connected is shorter than a set distance, based on image information of the camera, the controller is configured to control at least one of the manipulator moving mechanism, the first motor, the first actuator, the second motor, and the second actuator to connect the charging connector to the inlet regardless of a result of detecting by the safety sensor.

12. The charging robot of claim 1, wherein the manipulator moving mechanism is configured to move the multi-joint manipulator in a longitudinal direction of the multi-joint manipulator.

13. A control method of a charging robot, the method comprising:
   a position detection step of detecting position information of an inlet of an electric car based on image information of a camera;
   a control process calculation step of calculating a control process of a multi-joint manipulator having a charging connector provided on an end thereof, according to the position information of the inlet;
   a connection step of controlling the multi-joint manipulator according to the control process to connect the charging connector to the inlet;
   a charging step of charging the electric car through the charging connector; and
   a returning step of, when the charging is completed, controlling the multi-joint manipulator in reverse order of the control process to return the multi-joint manipulator to an original position.

14. The method of claim 13, wherein the connection step comprises:
   a pushing process of moving, by a manipulator moving mechanism, the multi-joint manipulator until one joint of the multi-joint manipulator reaches a set point;
   a motor connection process of connecting a motor to the one joint positioned at the set point;
   a pivoting process of pivoting, by the motor, the one joint by a predetermined angle; and
   a motor separation process of separating the motor from the one joint.

15. The method of claim 14, wherein the connection step further comprises a re-pushing process of, after the motor is separated from the one joint, moving, by the manipulator moving mechanism, the multi-joint manipulator until another joint connected to the one joint reaches the set point.

16. The method of claim 13, wherein, when the position of the inlet is changed in the middle of the connection step, a modification control process having the control process modified by using image information of the camera is calculated.

17. The method of claim 16, wherein, when the position of the inlet is changed in the middle of the connection step, the multi-joint manipulator is returned to the original position by controlling the multi-joint manipulator in reverse order of the modification control process at the returning step.

18. The method of claim 13, wherein, when a person or an obstacle is detected by a safety sensor provided on an end of the multi-joint manipulator in the middle of the connection step, the movement of the multi-joint manipulator is stopped.

19. The method of claim 18, wherein, when a distance between the charging connector and the inlet is shorter than a set distance, the movement of the multi-joint manipulator is not stopped regardless of a result of detecting by the safety sensor.

* * * * *